(12) United States Patent
White

(10) Patent No.: US 12,710,914 B2
(45) Date of Patent: Aug. 18, 2026

(54) TECHNIQUES FOR CONTEXT-DEPENDENT HOME THEATER TRANSITIONS

(71) Applicant: Sonos, Inc., Goleta, CA (US)

(72) Inventor: Jason P. White, Austin, TX (US)

(73) Assignee: Sonos, Inc., Goleta, CA (US)

( * ) Notice: Subject to any disclaimer, the term of this patent is extended or adjusted under 35 U.S.C. 154(b) by 172 days.

(21) Appl. No.: 18/820,556

(22) Filed: Aug. 30, 2024

(65) Prior Publication Data

US 2025/0106469 A1 Mar. 27, 2025

Related U.S. Application Data

(60) Provisional application No. 63/584,542, filed on Sep. 22, 2023.

(51) Int. Cl.
*H04B 3/00* (2006.01)
*G06F 3/16* (2006.01)

(52) U.S. Cl.
CPC .................................... *G06F 3/162* (2013.01)

(58) Field of Classification Search
CPC ....................................................... G06F 3/162
USPC ...................................................... 381/80, 81
See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLORENZO |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |

(Continued)

FOREIGN PATENT DOCUMENTS

| | | | |
|---|---|---|---|
| EP | 1389853 | A1 | 2/2004 |
| WO | 0153994 | A2 | 7/2001 |
| WO | 03093950 | A2 | 11/2003 |

OTHER PUBLICATIONS

AudioTron Quick Start Guide, Version 1.0, Mar. 2001, 24 pages.

(Continued)

*Primary Examiner* — Ammar T Hamid
(74) *Attorney, Agent, or Firm* — Secant IP, P.L.L.C.

(57) ABSTRACT

An example of a playback device includes a wireless communication interface, at least one processor, and at least one tangible non-transitory computer-readable medium storing program instructions that, when executed by the at least one processor, cause the playback device to receive audio content, during a playback session, communicate, via the wireless communication interface, one or more channels of the (Continued)

audio content to at least one satellite playback device to coordinate synchronous rendering of the audio content by the at least one satellite playback device, during the playback session, detect a request to transfer playback of the audio content to a target playback device, determine a context of the playback session, and process the request according to the context of the playback session.

20 Claims, 16 Drawing Sheets

(56) References Cited

U.S. PATENT DOCUMENTS

| | | | |
|---|---|---|---|
| 7,130,608 B2 | 10/2006 | Hollström et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,942,252 B2 | 1/2015 | Balassanian et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty | |
| 2004/0024478 A1 | 2/2004 | Hans et al. | |
| 2007/0142944 A1 | 6/2007 | Goldberg et al. | |
| 2017/0242651 A1* | 8/2017 | Lang | G06F 3/165 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

*Sonos, Inc.* v. *D&M Holdings* (No. 14-1330-RGA), DI 219, Claim Construction Opinion (Jan. 12, 2017) (24 pages).

U.S. Appl. No. 60/490,768, filed Jul. 28, 2003, entitled "Method for synchronizing audio playback between multiple networked devices," 13 pages.

U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

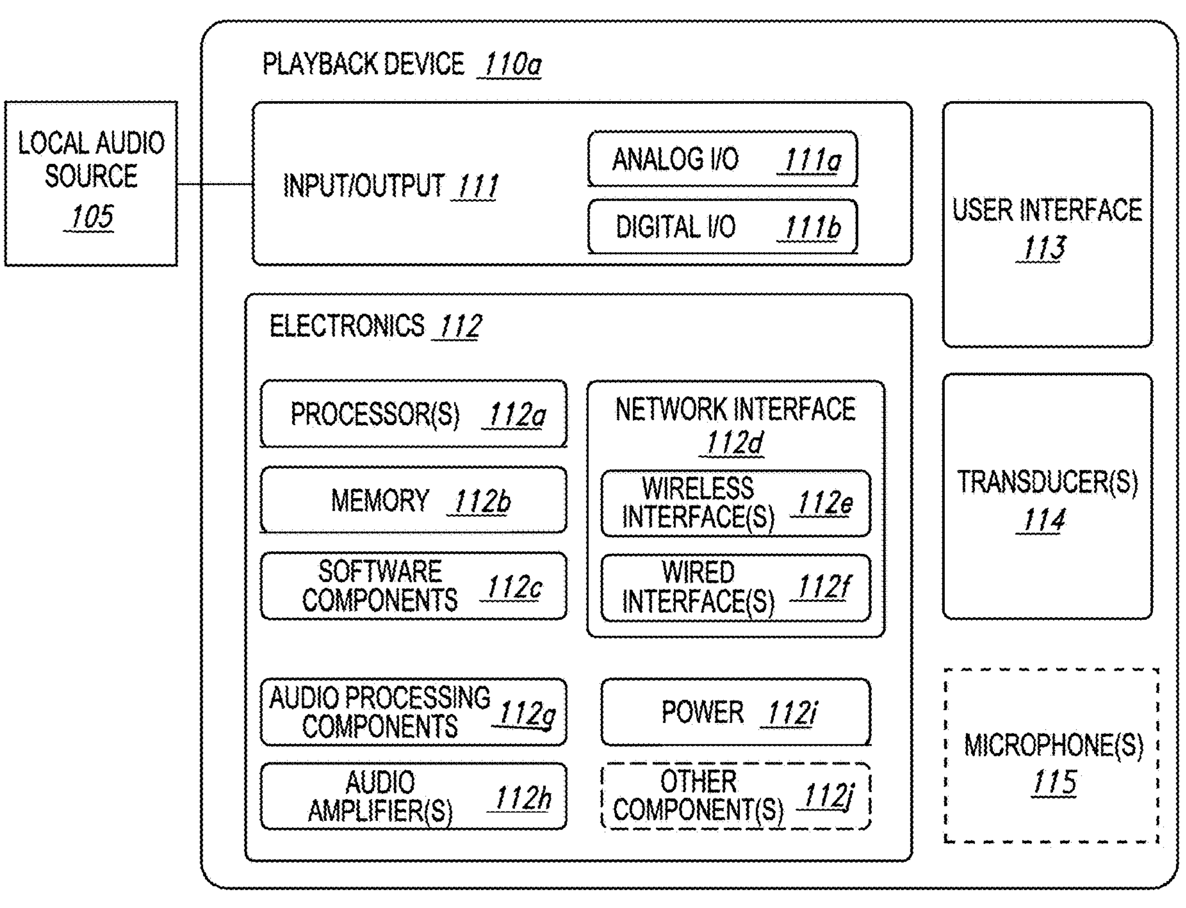
*Fig. 1C*
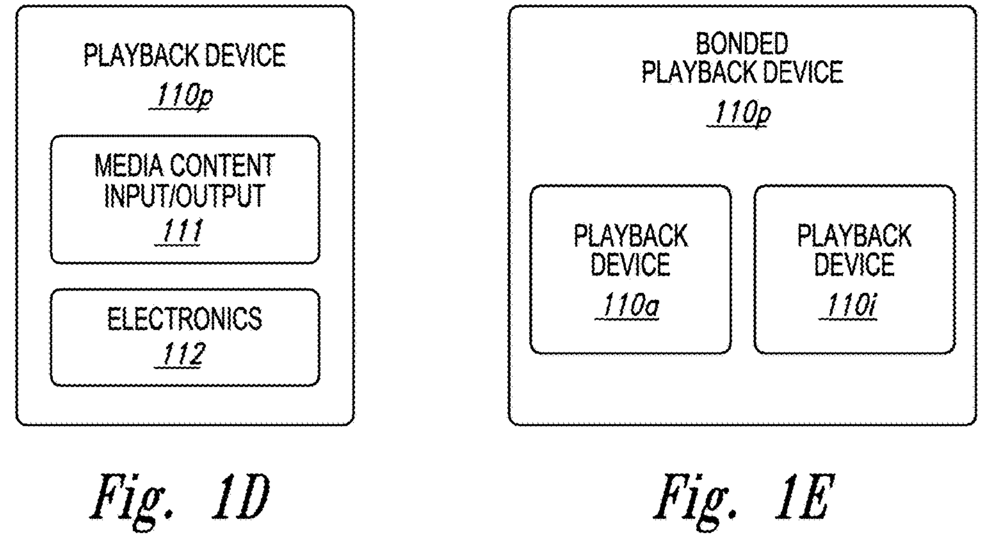
*Fig. 1D*
*Fig. 1E*

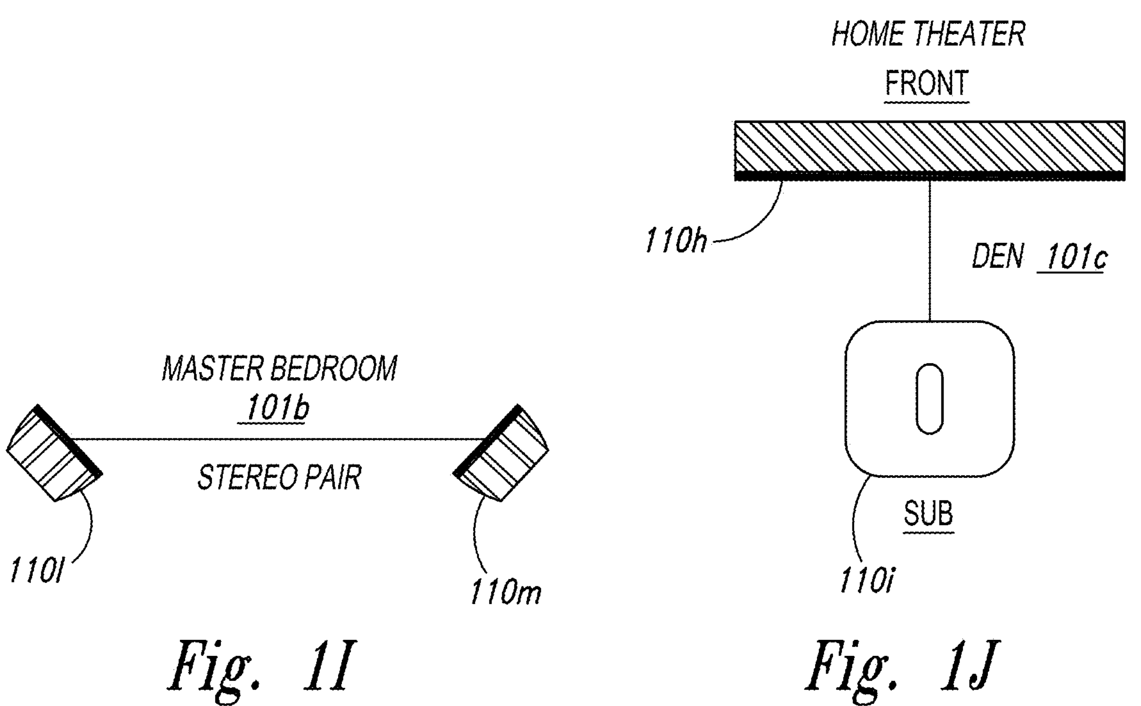
Fig. 1I
Fig. 1J
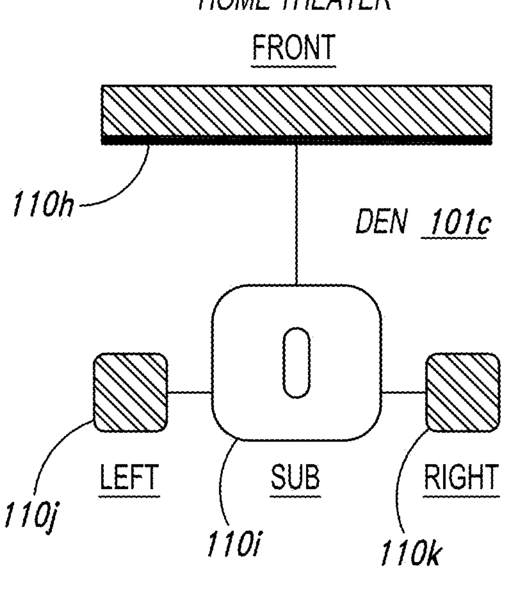
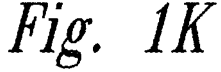
Fig. 1K
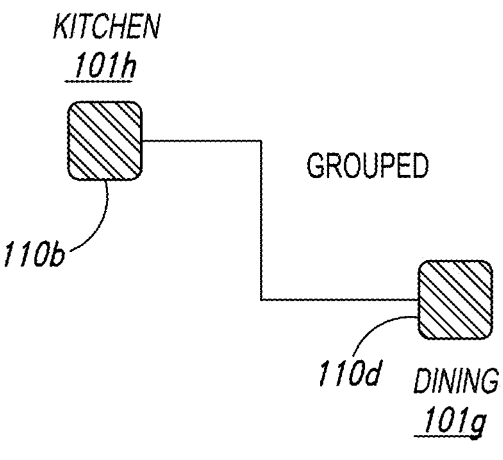
Fig. 1L

TECHNIQUES FOR CONTEXT-DEPENDENT HOME THEATER TRANSITIONS

CROSS-REFERENCE TO RELATED APPLICATION

This application claims priority under 35 U.S.C. § 119 (e) to U.S. Provisional Application No. 63/584,542 titled "TECHNIQUES FOR CONTEXT-DEPENDENT HOME THEATER TRANSITIONS" and filed on Sep. 22, 2023, which is hereby incorporated herein by reference in its entirety for all purposes.

FIELD OF THE DISCLOSURE

The present disclosure is related to consumer goods and, more particularly, to methods, systems, products, services, and other elements directed to media playback or some aspect thereof.

BACKGROUND

Options for accessing and listening to digital audio in an out-loud setting were limited until in 2002, when Sonos, Inc. began development of a new type of playback system. Sonos then filed one of its first patent applications in 2003, entitled "Method for Synchronizing Audio Playback between Multiple Networked Devices," and began offering its first media playback systems for sale in 2005. The SONOS Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C is a block diagram of one example of a playback device in accordance with aspects of the disclosed technology.

FIG. 1D is a block diagram of another example of a playback device in accordance with aspects of the disclosed technology.

FIG. 1E is a block diagram of a bonded playback device according to aspects of the present disclosure.

FIGS. 1I through 1L are schematic diagrams of corresponding media playback system zones in accordance with aspects of the disclosed technology.

Figure 1A:
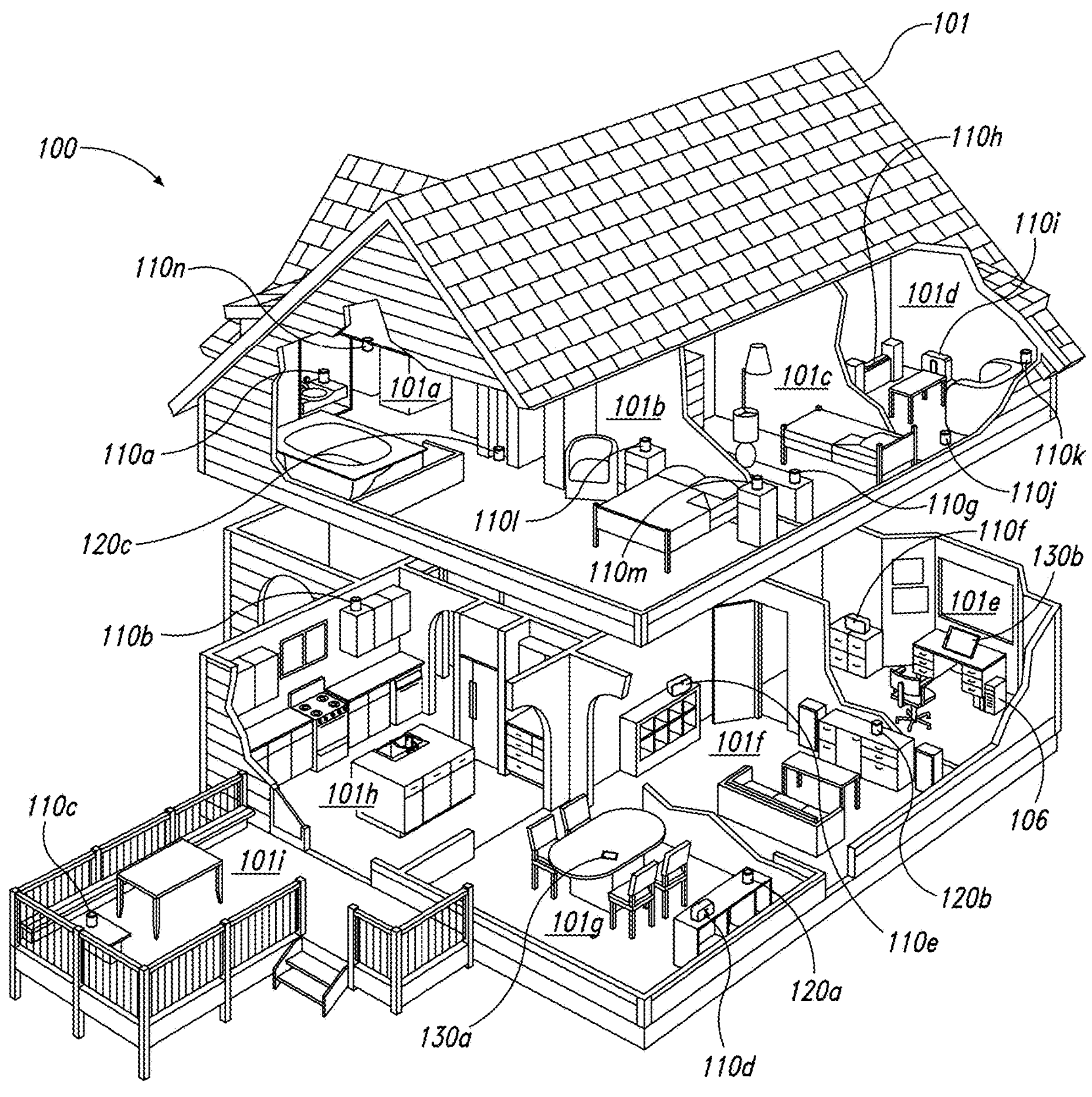
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Example systems and techniques described herein relate to transitioning a playback session between different playback devices. For example, certain techniques described herein relate to transitioning a playback session between portable (e.g., battery-operated, carryable) playback devices or wearable playback devices (e.g., "smart" headphones and earbuds) and playback devices of a media playback system, such as a primary playback device and/or one or more satellite playback devices in a home theater bonded group. Such transitions are referred to herein as "swaps" or "playback session swaps." Examples of swap techniques disclosed herein facilitate continuity of playback when transitioning between locations or between listening paradigms (e.g., personal or out-loud). Further, some examples described herein may reduce the extent of user input (or other user involvement) involved with transitioning playback as compared with some other techniques.

There are numerous scenarios in which a user may wish to transition an active playback session from one playback device, or group of playback devices, to another, or to add a new playback device into a group currently rendering audio during a playback session. For example, a user watching a movie or television program using their home theater set-up may wish to transition the audio from playing on their home theater surround speakers (current playback devices) to playing on headphones (target playback device) so that the user can continue to enjoy their movie or television program without disturbing other household members. In another example, a user who needs to move to a new location within their environment (e.g., from one room to another) may wish to add a portable device to a bonded group of playback devices (home theater or other) so that the user can take the portable device with them to the new location. This allows the user to continue listening to a playback session while other users remaining in the original location also continue to listen to the playback session using the bonded group of playback devices.

In some instances, the context of the playback session (e.g., the type of audio being played, location of the current and/or target playback device(s), characteristics of the target playback device(s), etc.) may influence how that playback session may or should be transitioned between different playback devices. To avoid or reduce unnecessary and/or complex user involvement when transitioning playback sessions, examples disclosed herein provide techniques by which a playback device may automatically evaluate the context of a playback session upon receiving a swap request and process the swap request accordingly.

In some embodiments, for example, a first playback device, operating in a coordinator mode (referred to herein as a "coordinator playback device"), comprises a communication interface, at least one processor, and at least one tangible non-transitory computer-readable medium storing program instructions that, when executed by the at least one processor, cause the coordinator playback device to perform the following actions. The coordinator playback device may receive audio content, and during a playback session, communicate, via the communication interface, one or more channels of the audio content to at least one second playback device to coordinate synchronous rendering of the audio content by at least one second playback device. During the playback session, the coordinator playback device may detect a request to transfer playback of the audio content to a third playback device. Accordingly, the coordinator playback device may determine a context of the playback session and process the request according to the context of the playback session. As discussed in more detail below, in some examples, the context of the playback session includes the type of audio being rendered, for example, whether or not the audio content is associated with video content. In further examples, the context of the playback session includes whether or not the target playback device(s) have appropriate authority to render the audio content and/or which type(s) of network protocols are supported by the target playback device(s). As noted above, in some examples, the context of the playback session also includes the location within the media playback system environment of the current and/or target playback devices. In some examples, processing the swap request may include initiating or denying the swap based on the context of the playback session. In some examples, processing the swap request includes selecting a particular network protocol for communication with the target playback device based on the context of the playback session. These and other examples are discussed in more detail below.

While some examples described herein may refer to functions performed by given actors such as "users," "listeners," and/or other entities, it should be understood that such references are for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles, and other features shown in the Figures are merely illustrative of particular embodiments of the disclosed technology. Accordingly, other embodiments can have other details, dimensions, angles, and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices 120 ("NMDs") (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices, etc.) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation, etc.). In some embodiments, for example, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various embodiments of the disclosure are described in greater detail below with respect to FIGS. 1B-1M.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane, etc.), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some aspects, a single playback zone may include multiple rooms or spaces. In certain aspects, a single room or space may include multiple playback zones.

In the illustrated embodiment of FIG. 1A, the second bedroom 101*c*, the office 101*e*, the living room 101*f*, the dining room 101*g*, the kitchen 101*h*, and the outdoor patio 101*i* each include one playback device 110, and the master bathroom 101*a*, the master bedroom 101*b*, and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h*-110*k* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B, 1E, and 1I-1M.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
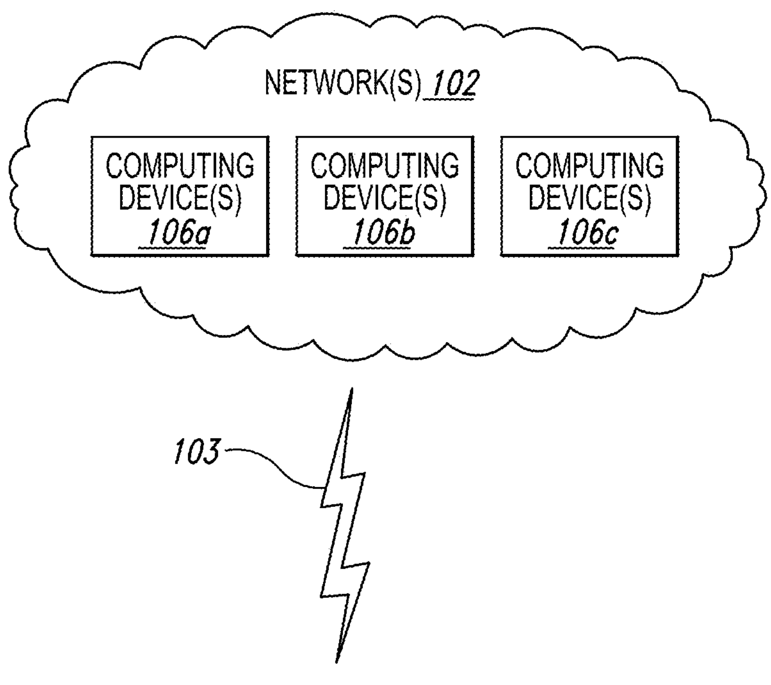
FIG. 1B is a schematic diagram of the media playback system of FIG. 1A and one or more networks.
Figure 1B:
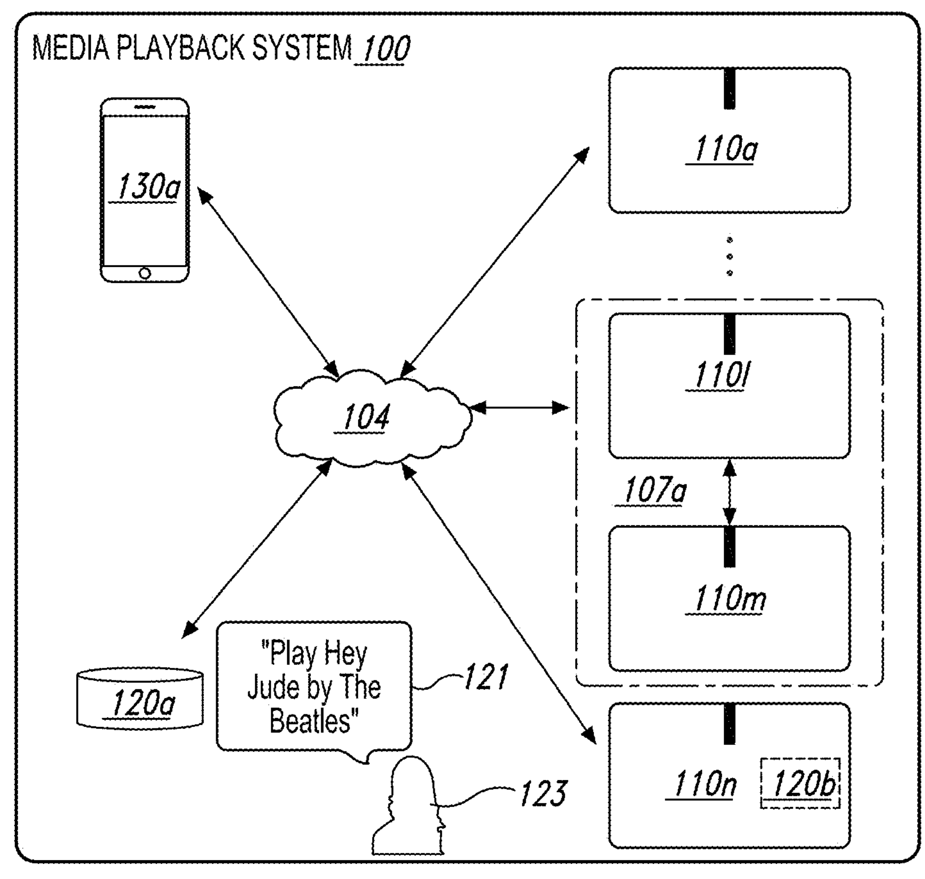

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication networks, and/or other suitable data transmission protocol networks), etc. The cloud network 102 is configured to deliver media content (e.g., audio content, video content, photographs, social media content, etc.) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WI-FI network, a BLUETOOTH network, a Z-WAVE network, a ZIGBEE network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WI-FI" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household or commercial facility communication network (e.g., a household or commercial facility WI-FI network). In some embodiments, the links 103 and the network 104 comprise one or more of the same networks. In some aspects, for example, the links 103 and the network 104 comprise a telecommunication network (e.g., an LTE network, a 5G network, etc.). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud servers that host cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length, etc.) and other associated information (e.g., URIs, URLs, etc.) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1I through 1M.

The media playback system 100 includes the NMDs 120*a* and 120*b*, each comprising one or more microphones configured to receive voice utterances from a user. In the illustrated embodiment of FIG. 1B, the NMD 120*a* is a standalone device and the NMD 120*b* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) facilitate one or more operations on behalf of the media playback system 100.

In some aspects, for example, the computing device 106*c* comprises one or more modules and/or servers of a VAS (e.g., a VAS operated by one or more of SONOS, AMAZON, GOOGLE, APPLE, MICROSOFT, etc.). The computing device 106*c* can receive the voice input data from the NMD 120*a* via the network 104 and the links 103.

In response to receiving the voice input data, the computing device 106*c* processes the voice input data (i.e., "Play Hey Jude by The Beatles"), and determines that the processed voice input includes a command to play a song (e.g., "Hey Jude"). In some embodiments, after processing the voice input, the computing device 106*c* accordingly transmits commands to the media playback system 100 to play back "Hey Jude" by the Beatles from a suitable media service (e.g., via one or more of the computing devices 106) on one or more of the playback devices 110. In other embodiments, the computing device 106*c* may be configured to interface with media services on behalf of the media playback system 100. In such embodiments, after processing the voice input, instead of the computing device 106*c* transmitting commands to the media playback system 100 causing the media playback system 100 to retrieve the requested media from a suitable media service, the computing device 106*c* itself causes a suitable media service to provide the requested media to the media playback system 100 in accordance with the user's voice utterance.

b. Suitable Playback Devices

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WI-FI, BLUETOOTH, or another suitable communication link. In certain embodiments, the analog I/O 111*a* and the digital I/O 111*b* comprise interfaces (e.g., ports, plugs, jacks, etc.) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a BLUETOOTH connection, an ad hoc wired or wireless communication network, and/or another suitable communication link). The local audio source 105 can comprise, for example, a mobile device (e.g., a smartphone, a tablet, a laptop computer, etc.) or another suitable audio component (e.g., a television, a desktop computer, an amplifier, a phonograph (such as LP turntable), a Blu-ray player, a memory storing digital media files, etc.). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens, etc.), and one or more transducers 114 (referred to hereinafter as "the transducers 114"). The electronics 112 are configured to receive audio from an audio source (e.g., the local audio source 105) via the input/output 111 or one or more of the computing devices 106*a-c* via the network 104 (FIG. 1B), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

Figure 2:
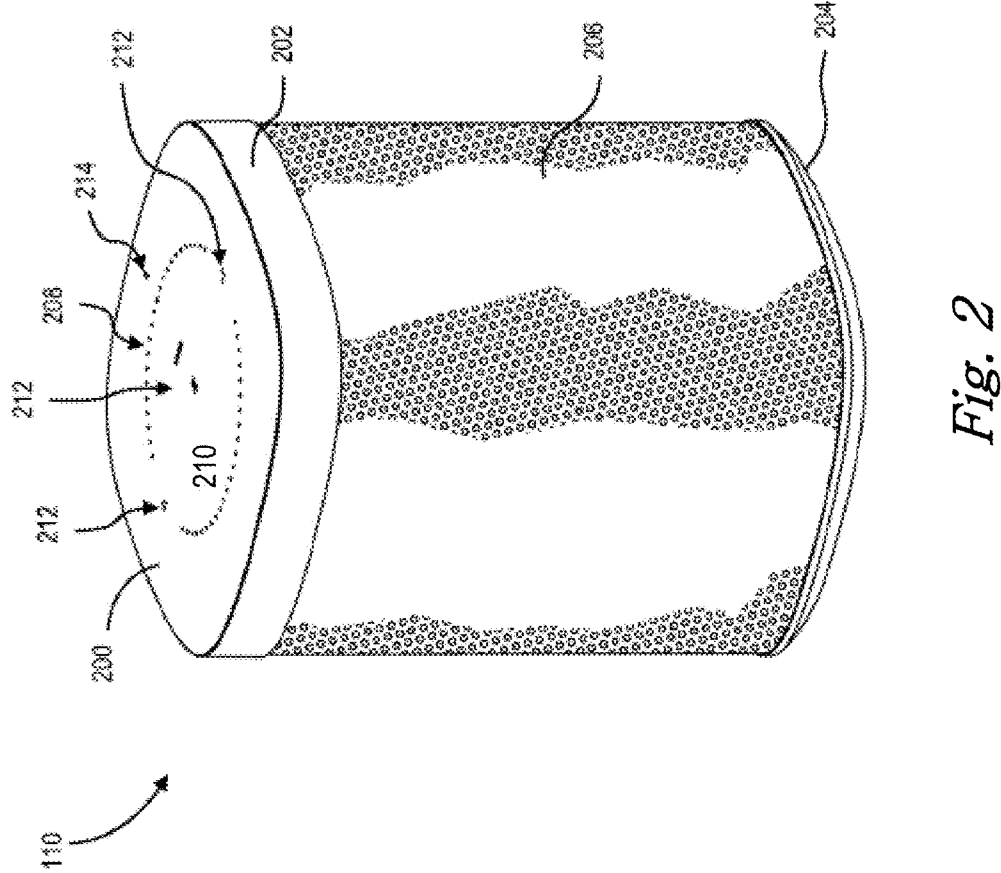
FIG. 2 is a side isometric view of an example of a playback device configured in accordance with aspects of the present disclosure.

As an illustrative example, FIG. 2 shows an example housing 200 of a playback device 110 that includes a user interface 113 in the form of a control area 210 at a top portion 202 of the housing 200. The housing may comprise the top portion 202, a lower portion 204, and an intermediate portion 206. In some examples, the control area 210 includes buttons 212 for controlling audio playback, volume level, and other functions. The control area 210 may also include a button 214 for toggling the microphones 115 to either an on state or an off state. In certain examples, the control area 210 is at least partially surrounded by apertures 208 formed in the top portion 202 of the housing 200 through which the microphones 115 (not visible in FIG. 2) receive the sound in the environment of the playback device 110. The microphones 115 may be arranged in various positions along and/or within the top portion 202 or other areas of the housing 200 so as to detect sound from one or more directions relative to the playback device 110.

Referring again to FIG. 1C, in the illustrated example, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases, etc.).

The processors 112*a* can comprise clock-driven computing component(s) configured to process data, and the memory 112*b* can comprise a computer-readable medium (e.g., a tangible, non-transitory computer-readable medium loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone, etc.).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds, etc.) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receive and process the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WI-FI, BLUETOOTH, LTE, etc.). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 exclude the network interface 112*d* altogether and transmit and receive media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DACs), audio preprocessing components, audio enhancement components, digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omit the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers 112*h* include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G amplifiers, class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 include a single one of the amplifiers 112*h* configured to output amplified audio signals to a plurality of the transducers 114. In some other embodiments, the electronics 112 omit the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, Sonos, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," "AMP," "PORT," and "SUB." Other suitable playback devices may additionally or alternatively be used to implement the playback devices of example embodiments disclosed herein. Additionally, one of ordinary skill in the art will appreciate that a playback device is not limited to the examples illustrated or described herein or to Sonos product offerings. In some embodiments, for example, one or more playback devices 110 comprise wired or wireless headphones (e.g., over-the-ear headphones, on-ear headphones, in-ear earphones, etc.). In other embodiments, one or more of the playback devices 110 comprise a docking station and/or an interface configured to interact with a docking station for personal mobile media playback devices. In certain embodiments, a playback device may be integral to another device or component such as a television, an LP turntable, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is a full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device.

c. Suitable Network Microphone Devices (NMDs)

Figures 1F, 1G, 1H:
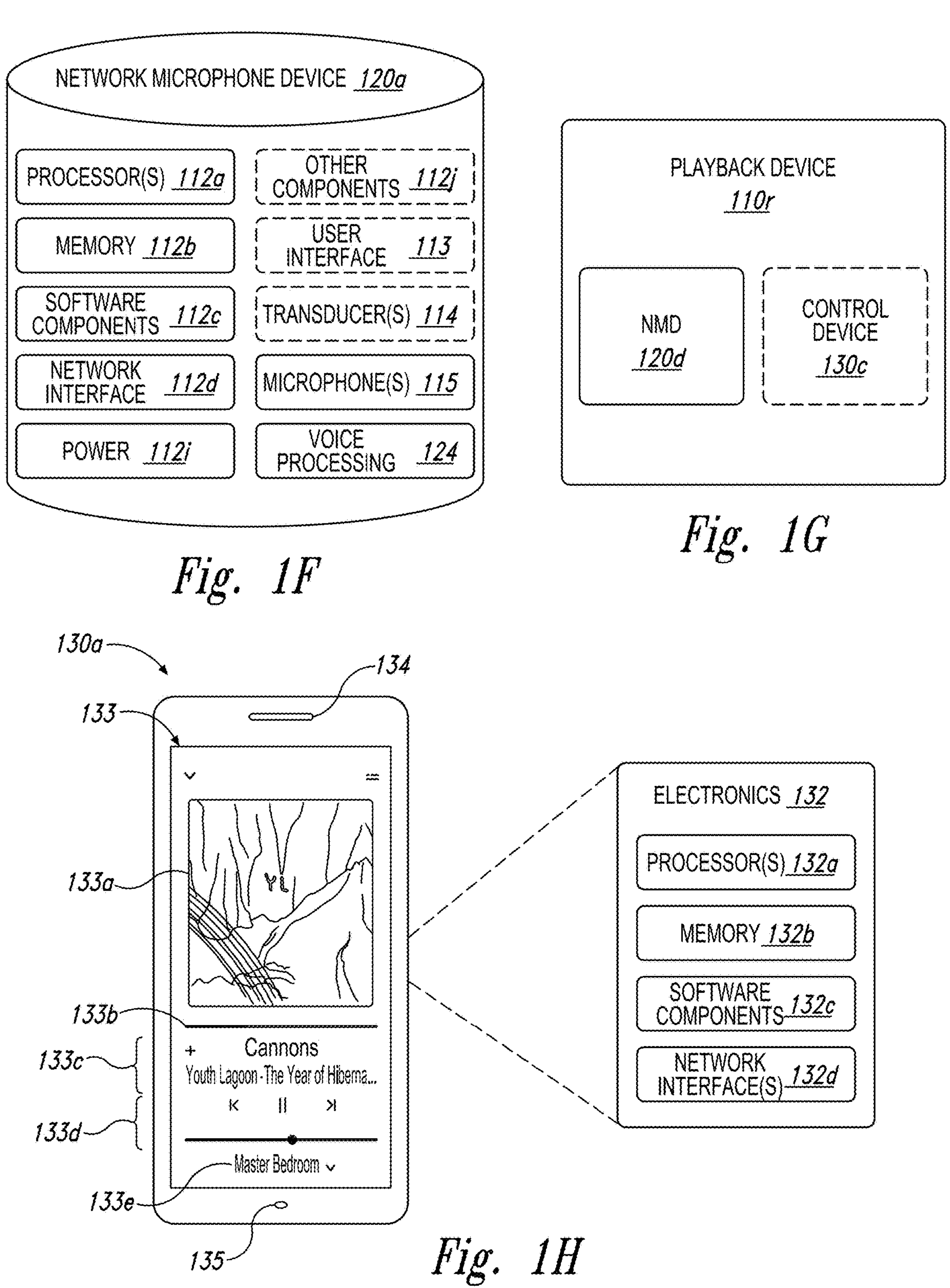
FIG. 1F is a block diagram of one example of a network microphone device in accordance with aspects of the disclosed technology.
FIG. 1G is a block diagram of another example of a playback device in accordance with aspects of the disclosed technology.
FIG. 1H is a partial schematic diagram of an example of a control device in accordance with aspects of the disclosed technology.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 112*h*, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing components 124, and only a portion of the components of the electronics 112 described above with respect to FIG. 1C. In some aspects, for example, the NMD 120*a* includes the processor 112*a* and the memory 112*b* (FIG. 1C), while omitting one or more other components of the electronics 112. In some embodiments, the NMD 120*a* includes additional components (e.g., one or more sensors, cameras, thermometers, barometers, hygrometers, etc.).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The playback device 110*r* optionally includes an integrated control device 130*c*. The control device 130*c* can comprise, for example, a user interface (e.g., the user interface 113 of FIG. 1C) configured to receive user input (e.g., touch input, voice input, etc.) without a separate control device. In other embodiments, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receive and analyze the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON VAS, a user might speak the activation word "Alexa." Other examples include "Ok, Google" for invoking the GOOGLE VAS and "Hey, Siri" for invoking the APPLE VAS.

After detecting the activation word, voice processing components 124 monitor the microphone data for an accompanying user request in the voice input. The user request may include, for example, a command to control a third-party device, such as a thermostat (e.g., NEST thermostat), an illumination device (e.g., a PHILIPS HUE lighting device), or a media playback device (e.g., a SONOS playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partial schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone, etc.) on which media playback system controller application software is installed. In some embodiments, the control device 130*a* comprises, for example, a tablet (e.g., an iPad™), a computer (e.g., a laptop computer, a desktop computer, etc.), and/or another suitable device (e.g., a television, an automobile audio head unit, an IoT device, etc.). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 132*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE, etc.). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection, etc.) from the control device 130*a* to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others. Additional description of zones and groups can be found below with respect to FIGS. 1I through 1M.

The user interface 133 is configured to receive user input and can facilitate control of the media playback system 100. The user interface 133 includes media content art 133*a* (e.g., album art, lyrics, videos, etc.), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year, etc.) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone, etc.). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound, etc.) and/or configured to facilitate filtering of background noise. Moreover, in certain embodiments, the control device 130*a* is configured to operate as a playback device and an NMD. In other embodiments, however, the control device 130*a* omits the one or more speakers 134 and/or the one or more microphones 135. For instance, the control device 130*a* may comprise a device (e.g., a thermostat, an IoT device, a network device, etc.) comprising a portion of the electronics 132 and the user interface 133 (e.g., a touch screen) without any speakers or microphones.

e. Suitable Playback Device Configurations

Figure 1M:
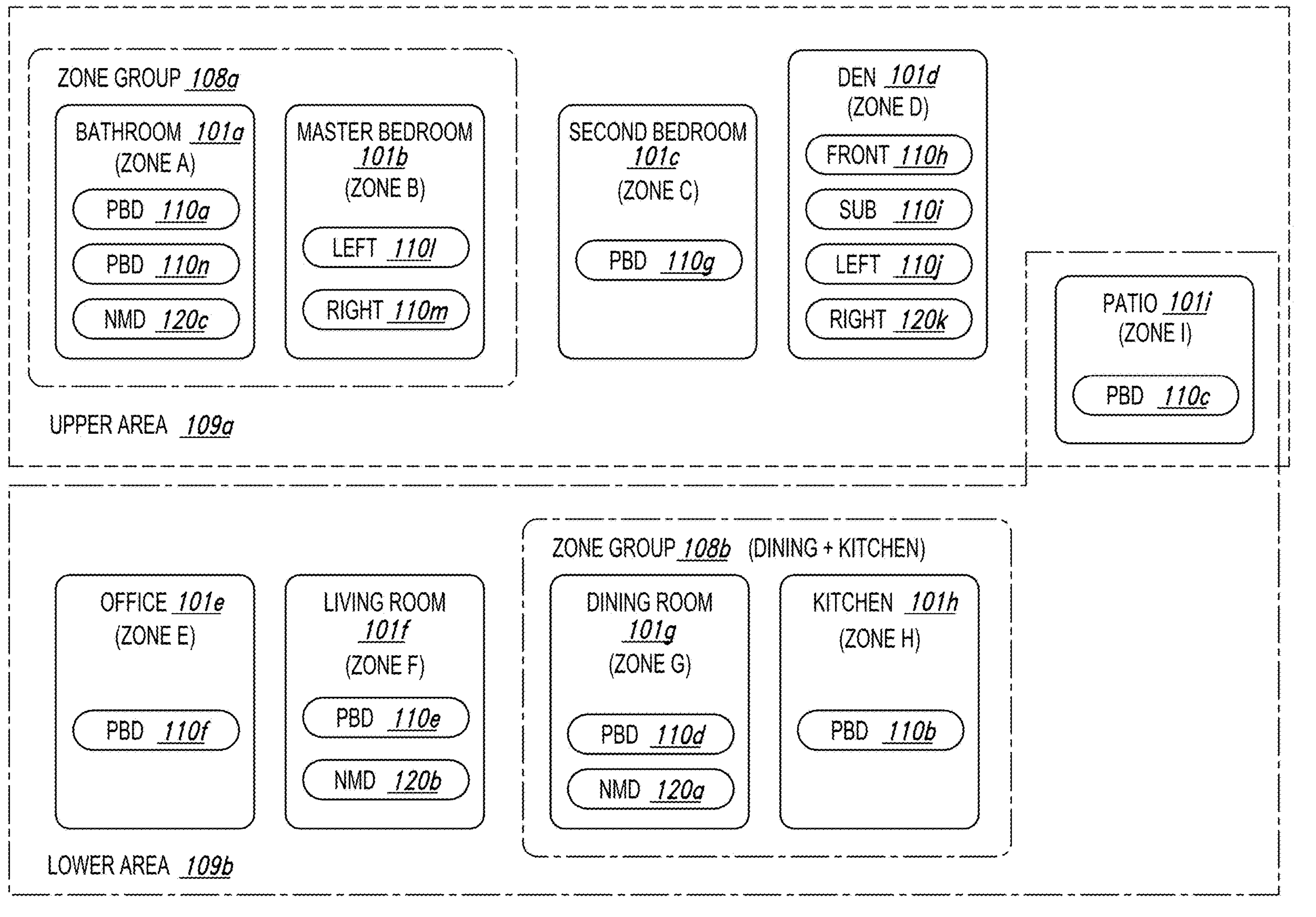
FIG. 1M is a schematic diagram of media playback system areas according to aspects of the present disclosure.

FIGS. 1I through 1M show example configurations of playback devices in zones and zone groups. Referring first to FIG. 1M, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*m* (e.g., a right playback device) to form Zone B. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*b* and 110*d* can be merged to form a merged group or a zone group 108*b*. The merged playback devices 110*b* and 110*d* may not be specifically assigned different playback responsibilities. That is, the merged playback devices 110*b* and 110*d* may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1I, the playback devices 110*l* and 110*m* may be bonded so as to produce or enhance a stereo effect of audio content. In this example, the playback device 110*l* may be configured to play a left channel audio component, while the playback device 110*m* may be configured to play a right channel audio component. In some implementations, such stereo bonding may be referred to as "pairing."

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured to render low frequencies. When unbonded, however, the Front device 110*h* can be configured to render a full range of frequencies. As another example, FIG. 1K shows the Front and SUB devices 110*h* and 110*i* further bonded with Left and Right playback devices 110*j* and 110*k*, respectively. In some implementations, the Left and Right devices 110*j* and 110*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* in the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in U.S. Pat. No. 10,499,146 titled "Voice control of a media playback system" and filed on Feb. 21, 2017.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can be assigned a name such as "Dining+Kitchen", as shown in FIG. 1M. In some embodiments, a zone group may be given a unique name selected by a user.

Certain data may be stored in a memory of a playback device (e.g., the memory 112*b* of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variable instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the memory may store variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109*a* including Zones A-D and I, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. Pat. No. 10,712,997 filed Aug. 21, 2017, and titled "Room Association Based on Name," and U.S. Pat. No. 8,483,853 filed Sep. 11, 2007, and titled "Controlling and manipulating groupings in a multi-zone media system." Each of these patents is incorporated herein by reference in its entirety. In some embodiments, the media playback system 100 may not implement Areas, in which case the system may not store variables associated with Areas.

III. Example Home Theater Transition Techniques

As described above, in some instances, playback devices that are bonded may have different playback responsibilities, such as responsibilities for certain audio channels. For example, as illustrated in FIG. 1K, in a home theater environment, the Front and SUB devices 110*h* and 110*i* can be bonded with Left and Right playback devices 110*j* and 110*k*, respectively. Further, in some implementations, the Right and Left devices 110*j* and 110*k* can be configured to form surround or "satellite" channels of a home theater system. The bonded playback devices 110*h*, 110*i*, 110*j*, and 110*k* may form a single Zone D (FIG. 1M).

Figure 3:
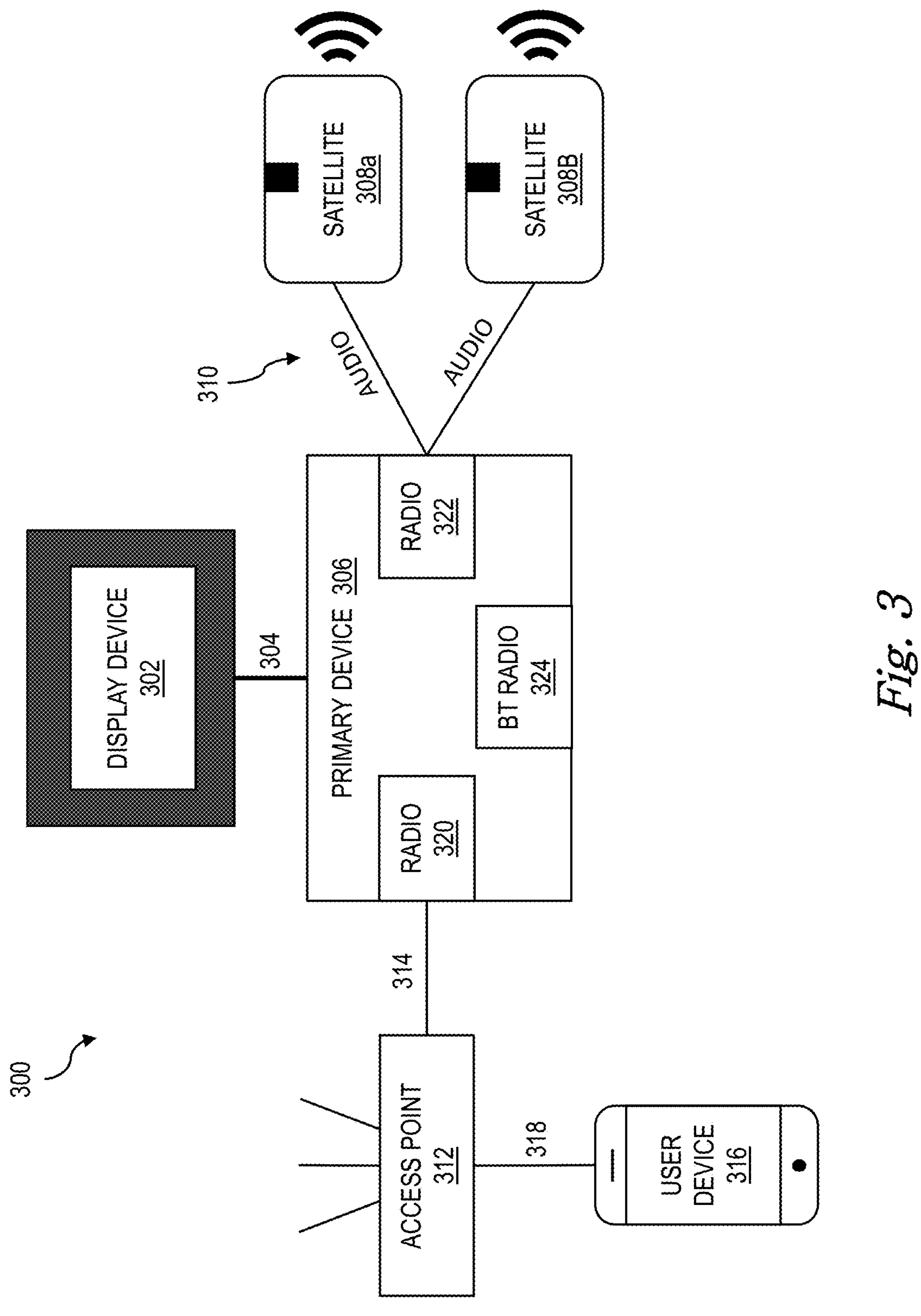
FIG. 3 is a block diagram of one example of a home theater environment according to aspects of the present disclosure.

FIG. 3 illustrates an example of a home theater environment 300. As shown, the home theater environment 300 comprises a display device 302, such as a television or monitor, that displays visual content and outputs audio content (associated with the displayed visual content) via a communication link 304 to a primary device 306 (e.g., a soundbar, a smart TV box, a smart TV stick, etc.). The primary device 306 communicates with one or more satellite devices 308 (shown as satellite devices 308*a* and 308*b*) via one or more communication links 310. The primary device 306 and the satellite devices 308 may form a bonded group, such as a home theater group. In certain examples, the communication links 310 correspond to one or more communication channels within a wireless network (e.g., a fronthaul connection) that is established for communication between the primary device 306 and the satellite devices 308, as described further below. Additionally, the primary device 306 communicates with an access point (AP) 312 via a communication link 314 (e.g., a backhaul connection). The AP 312, in turn, communicates with other devices such as a user device 316 (e.g., a smartphone, tablet, laptop, desktop computer, etc.) via communication link 318. In some examples, the primary device 306 may be integrated with the display device 302. For example a TV may include a smart soundbar.

As described above, according to certain examples, the primary device 306 includes one or more wired and/or wireless communication interfaces for communication via the communications links 304, 310, and 314. For example, referring to FIG. 4, the primary device 306 may include a wireless communication interface 402 and an audio interface 404, which may be a wired or wireless interface. The audio interface 404 may be used to establish the communication link 304 between the primary device 306 and the display device 302. The primary device 306 may further include processing circuitry 406 (e.g., including any one or more of the processors 112*a*, memory 112*b*, software components 112*c*, and/or audio processing components 112*g* described above) in communication with the wireless communication interface 402 and the audio interface 404.

In various circumstances, it may be desirable for the media playback system 100 to implement a low-latency communication scheme for wireless transmission of audio from the primary device 306 (e.g., a soundbar) to the satellite devices 308 (e.g., a subwoofer, a rear surround, etc.). Low-latency communication of audio enables expeditious transmission of audio content received at the primary device 306 from the display device 302 to the satellite devices 308 for playback within a short period of time (e.g., within tens of milliseconds) after receipt. Such expeditious transmission of the received audio allows the home theater system to render the received audio in lip-synchrony with the corresponding visual content displayed on the display device 302. Should the transmission of audio content from the primary device 306 to the satellite devices 308 take too long, the audio content associated with a given section of visual content may not reach the satellite devices in time to be rendered in lip-synchrony with the visual content (e.g., reaching the one or more satellite devices more than 40 milliseconds after the visual content has been rendered).

In such a low-latency communication scheme, the satellite devices 308 may connect to a dedicated wireless network established by the primary device 306 for communication of audio for playback. By employing a dedicated network established by the primary device 306 to communicate the audio traffic to the satellite devices 308, the audio traffic may be communicated directly to the satellite devices 308 without the delay otherwise introduced by an intermediary hop across the AP 312. Accordingly, referring to FIGS. 3 and 4, in some examples, the wireless communication interface 402 of the primary device 306 includes radio circuitry 408 including a first radio 320 (also referred to as a "backhaul radio") used to establish the communication link 314 to the AP 312 (also referred to as the backhaul connection) and a second radio 322 (also referred to as a "fronthaul radio") used to establish the communication link(s) 310 to the satellite devices 308 (also referred to as the fronthaul connection). The wireless communication interface 402 may further include at least one antenna 410 coupled to the radio circuitry 408. Thus, the fronthaul radio 322 can establish the communication links 310 within a dedicated network for transmission of audio content from the primary device 306 to the satellite devices 308, while the backhaul radio 320 may be configured to communicate over the backhaul connection 314 to the AP 312 (e.g., a user's AP in their home) so as to provide a communication path to other devices (e.g., the user device 316 to facilitate control of the home theater system and/or cloud server(s) to obtain audio content for streaming). In some examples, a wireless channel employed for the backhaul connection 314 to the AP 312 by the first radio 320 is in a different frequency band (e.g., 2.4 GHz band, 5 GHz band, 6 GHz band, etc.) and/or sub-band (e.g., a first portion of the 5 GHz band (e.g., bottom half of the wireless channels), a second portion of the 5 GHz band that is non-overlapping with the first portion (e.g., top half of the wireless channels), etc.) than the wireless channel used for the dedicated wireless network for communication of audio to the satellite devices 308 by the second radio 322.

The radio circuitry 408 including the first and second radios 320, 322 may be implemented using one or more integrated circuits (ICs) that may be packaged separately, together in any combination, or left unpackaged. In some instances, the first radio 320 and the second radio 322 may be integrated into separate ICs. In other instances, the first radio 320 and the second radio 322 may be integrated into a single IC. The first and second radios 320, 322 may be configured to support communication of data via at least one network protocol, such as an IEEE 802.11 wireless protocol, for example.

Figure 4:
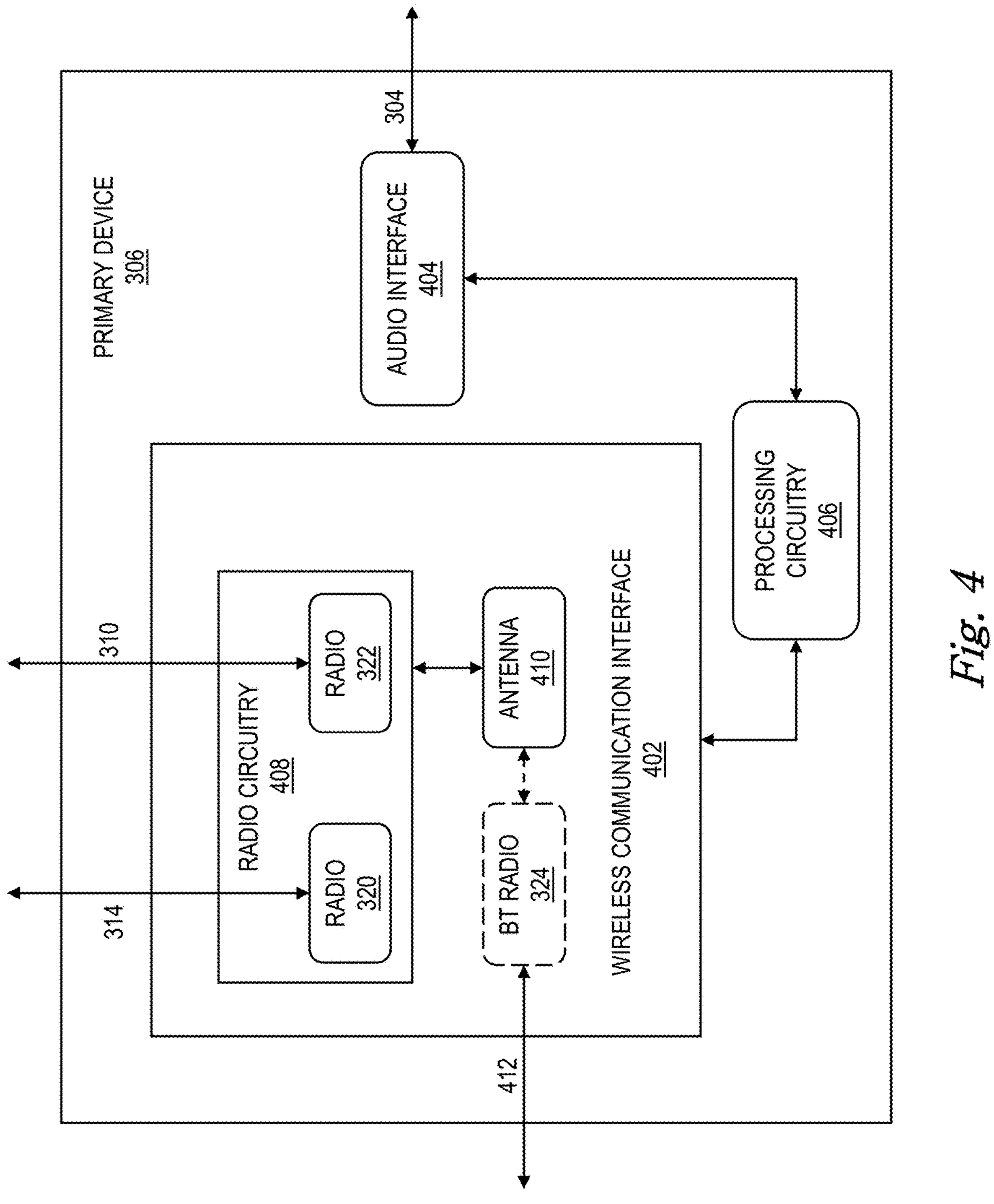
FIG. 4 is a block diagram illustrating certain components of one example of a playback device in accord with aspects of the present disclosure.

In some examples, the primary device 306 may further include a BLUETOOTH communication interface that includes a BLUETOOTH radio 324, as shown in FIGS. 3 and 4. In some examples, the BLUETOOTH radio 324 is part of the wireless communication interface 402 of the primary device 306, as shown in FIG. 4. In other examples, the BLUETOOTH radio 324 may be part of a separate wireless communication interface, for example, including a dedicated antenna and front-end circuitry. The BLUETOOTH radio 324 may be part of, or separate from, the radio circuitry 408 that includes the first and second radios 320, 322. In some examples, the at least one antenna 410 may include a dedicated BLUETOOTH antenna coupled to the BLUETOOTH radio 324. The BLUETOOTH radio 324 may be used to establish a communications link 412 to the user device 316 and/or to a satellite device 308, as described further below.

In some instances, the home theater environment 300 may play audio from a music streaming service. In such instances, the primary device 306 may communicate with one or more cloud servers associated with a music service provider (e.g., via the communication link 314 to the AP 312) to obtain the audio content for playback. After receipt of the audio content for playback, the primary device 306 may communicate the audio content (or any portion thereof) to the satellite devices 308 via the communication links 310 for synchronous playback. In examples where the primary device 306 is implemented as a soundbar (or otherwise comprises transducers for rendering audio content), the primary device 306 may render the audio content in synchrony with the satellite devices 308. In examples where the primary device 306 is implemented as a smart TV box or smart TV stick (or otherwise does not comprise transducers for rendering audio content), the satellite devices 308 may render the audio content in synchrony with each other while the primary device 306 may not render the audio content.

As described above, in some instances, the primary device 306 and the satellite devices 308 may render audio content in lip-synchrony with associated visual content displayed by the display device 302. In such examples, the primary device 306 may receive audio content from the display device 302. For example, the primary device 306 and the display device 302 can include analog and/or digital interfaces that facilitate communicating the audio content (e.g., multi-channel audio content) such as a SPDIF RCA interface, an HDMI interface (e.g., audio return channel (ARC) HDMI interface), an optical interface (e.g., TOSLINK interface), etc. In such examples, the communication link 304 may comprise a wired connection (e.g., an SPDIF cable, an HDMI cable, a TOSLINK cable, etc.). In other examples, the primary device 306 and the display device 302 may include wireless circuitry that facilitates wirelessly communicating the audio content from the display device 302 to the primary device 306. In such examples, the communication link 304 may be a wireless communication link such as a WI-FI link, BLUETOOTH link, ZIGBEE link, Z-WAVE link, and/or wireless HDMI link.

After receipt of the audio content associated with visual content to be rendered by the display device 302, the primary device 306 may communicate the received audio content (or any portion thereof) to the satellite devices 308 (e.g., via communication links 310). Any of a variety of methodologies may be employed to communicate the audio content to the satellite devices 308. Once the audio content has been communicated to the satellite devices 308, the satellite devices (and/or the primary device 306) may render the audio content in synchrony with each other and in lip-synchrony with visual content displayed on the display device 302. For instance, in examples where the primary device 306 is implemented as a soundbar (or otherwise comprises transducers for rendering audio content), the primary device 306 may render the audio content in synchrony with the satellite devices 308 and in lip-synchrony with the visual content displayed on the display device 302. In examples where the primary device 306 is implemented as a smart TV box or smart TV stick (or otherwise does not comprise transducers for rendering audio content), the satellite devices 308 may render the audio content in synchrony with each other and in lip-synchrony with the display of visual content on the display device 302 while the primary device 306 may not render the audio content.

Thus, the audio content received by the primary device 306 and communicated to the satellite devices 308 may be any type of audio content and may or may not be associated with video content. For example, in some embodiments, the audio content includes any one or more of: (i) streaming music or other audio obtained from a streaming media service, such as SPOTIFY, PANDORA, or other streaming media services or (ii) streaming music or other audio from a local music library, such as a music library stored on a user's laptop computer, desktop computer, smartphone, tablet, home server, or other computing device. In some such examples the audio content may be audio content that is not associated with video content. In other embodiments, the audio content is audio content that is associated with video content (e.g., audio content that is to be rendered in lip-synchrony with visual content, as described above), such as audio associated with a television program or movie received from any of a television, set-top box, Digital Video Recorder, Digital Video Disc player, streaming video service, or any other source of audio-visual media content.

In certain examples, the primary device 306 can receive a stream of audio content samples from the display device 302 or via the AP 312. The audio content samples that are communicated to the primary device 304 can be sampled at any of a wide variety of rates including, for example, 44.1 kilohertz (kHz), 48 kHz, 96 kHz, 176.2 kHz, and 192 kHz. Further, the audio content samples that are communicated to the primary device 304 may be uncompressed (e.g., Pulse-Code Modulation (PCM) audio), lossless compressed (e.g., ALAC or FLAC), or lossy compressed (e.g., MP3, LC3, SBC, or DOLBY audio such as DOLBY AC-3 audio or DOLBY AC-4 audio), and may have a single channel or multiple channels of audio content (e.g., mono, stereo, 5.1, 7.1.2, etc.). In addition, the audio content samples may contain other advanced rendering information, such as spatial content (e.g., DOLBY ATMOS).

As noted above, example techniques described herein relate to transitions (or "swaps") of a playback session between different playback devices 110 or groups of playback devices 110 (such as the home theater group including the satellite devices 308 and optionally the primary device 306 shown in FIG. 3). During a playback session swap, playback of audio content stops at a "source" playback device and starts at a "target" playback device at the same or substantially the same offset within the audio content. For instance, the media playback system 100 may swap playback between a "source" portable playback device and the one or more "target" playback device(s). In further examples, the media playback system 100 may swap playback between one or more "source" playback device(s) and a "target" portable playback device.

A playback device that has an on-going playback session may maintain or have access to playback session data that defines and/or identifies the playback session. The playback session data may include data representing a source of the audio content (e.g., a URI or URL indicating the location of the audio content), as well as an offset indicating a position within the audio content to start playback. The offset may be defined as a time (e.g., in milliseconds) from the beginning of the audio track or as a number of samples, among other examples. In example implementations, the offset may be set to a future playback position in the audio content, advanced in time relative to the current playback position, to allow time for the target device to start buffering the audio content. Then, the source playback device stops playback of the audio content at the offset and the target playback device starts playback of the audio content at the offset.

The playback session data may further include data representing playback state. Playback state may include a playback state of the session (e.g., playing, paused, or stopped). If the playback session implements a playback queue, the playback session data may include the playback queue state, such as the current playback position within the queue. The playback queue state may also include a queue version. For example, in a cloud queue embodiment, the cloud queue server and the media playback system 100 may use the queue version to maintain consistency. The queue version may be incremented each time the queue is modified and then shared between the media playback system 100 and cloud queue server to indicate the most recent version of the queue.

Further, the playback session data may also include authorization data, such as one or more keys and/or tokens. Such authorization data may include a token associated with the user account. During a playback session swap, the media playback system 100 may verify that the token is authorized on both the source and target playback devices. The authorization data may further include a token associated with the streaming audio service, which may enable the target playback device to access the audio content at the source. Yet further, the authorization data may include a token associated with the playback session, which enables the target playback device to access the session. Other example authorization data is contemplated as well. In some instances, authorization of the token, or lack thereof, may be part of the context of the playback session that is evaluated by a coordinating playback device (e.g., the primary device 306 of FIG. 3) to determine how to process a swap request, as described further below.

In some implementations, an input to a playback device triggers a request to implement a swap. This input may be referred to as a "playback session swap input" or "swap input." In some examples, a swap input may be provided via a user interface on the playback device or on a control device, such as the user interfaces 113 or 133, described above. Upon detection of the swap input, a methodology for processing the swap request may be implemented by one or more playback devices 110 in the media playback system 100. In some examples, the swap input is provided at the target playback device; however, in other examples, the swap input may be provided at the primary device 306 or at the user device 316. In some examples in which the primary device 306 is a "coordinating" playback device that determines the context of the playback session and processes the swap request accordingly, if the swap input is provided at another device in the media playback system 100, that device may communicate a message to the primary device 306 indicating that a swap input has been detected. Accordingly, the primary device 306 may detect a swap input, whether received directly via a user interface of the primary device or indirectly via another device in the media playback system 100. Various examples of swap inputs and processing thereof are described in U.S. Pat. No. 11,356,777 titled "PLAYBACK TRANSITIONS," which is hereby incorporated herein by reference in its entirety for all purposes.

Figure 5:
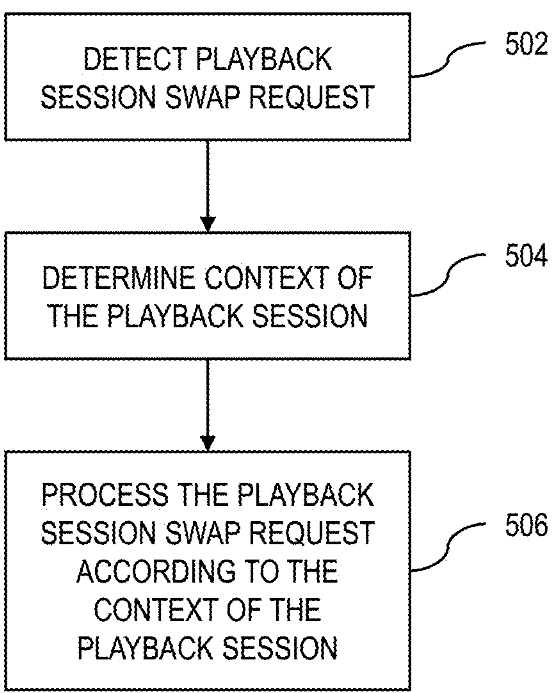
FIG. 5 is a flow diagram of one example of a method of processing a playback session swap request according to aspects of the present disclosure.

Referring to FIG. 5, there is illustrated a flow diagram of one example of a swap request processing methodology according to certain aspects. For ease of explanation, the following discussion will refer to the primary device 306 as being the coordinating device that processes swap requests in accord with examples of the methodology illustrated in FIG. 5. However, it will be appreciated that in various examples another network device (whether a playback device 110, an NMD 120, or a control device 130) in the media playback system may be a coordinating device. Therefore, examples and embodiments of the systems, methodology, processes, and operations described herein are not limited in implementation to the primary device 306 being the coordinating device and various functions, processes, operations, etc., may be performed by any device or group of devices within the media playback system 100.

At operation 502, the primary device 306 detects a playback session swap request. As described above, the primary device 306 may detect the playback session swap request directly, for example, by detecting a swap input provided at its user interface, or indirectly via one or more messages detected from one or more other network devices, at least one of which has detected the swap input. In examples, the playback session swap request identifies the target playback device(s).

At operation 504, based on detecting the playback session swap request, the primary device 306 determines a context of the playback session. As described above, the context of the playback session may include any one or more of various factors or characteristics associated with the playback session. For example, the context of the playback session may include the type of audio content being rendered (e.g., audio content associated with video content or audio content that is not associated with video content), the source of the audio content (e.g., the display device 302, a particular content streaming application or service, etc.), licensing considerations associated with the audio content, one or more characteristics of the target device(s) and/or the primary device 306, such as whether or not a target device has a WI-FI interface and/or a BLUETOOTH interface and/or whether the primary device 306 includes the BLUETOOTH interface, a location (or projected future location) of the target device(s), and/or whether the swap request involves a true swap (e.g., initiating the swap causes playback of audio content to stop at source playback device(s) and start at the target playback device(s)) or a "join" (e.g., a request to add the target device to the bonded group). Any or all of these factors may influence the manner in which the primary device 306 responds to the playback session swap request. Data specifying the factors may be stored in one or more data structures implemented within the media playback system 100 and/or obtained via one or more messages (e.g., application programming interface (API) calls) executed by the coordinating device.

Therefore, after determining the context of the playback session at operation 504, at operation 506, the primary device processes the playback session swap request according to the context of the playback session. Operation 506 may include performing the swap, denying the swap, or in the case of a join request, initiating the playback session at the target playback device(s). Various example scenarios are described below.

Figure 6A:
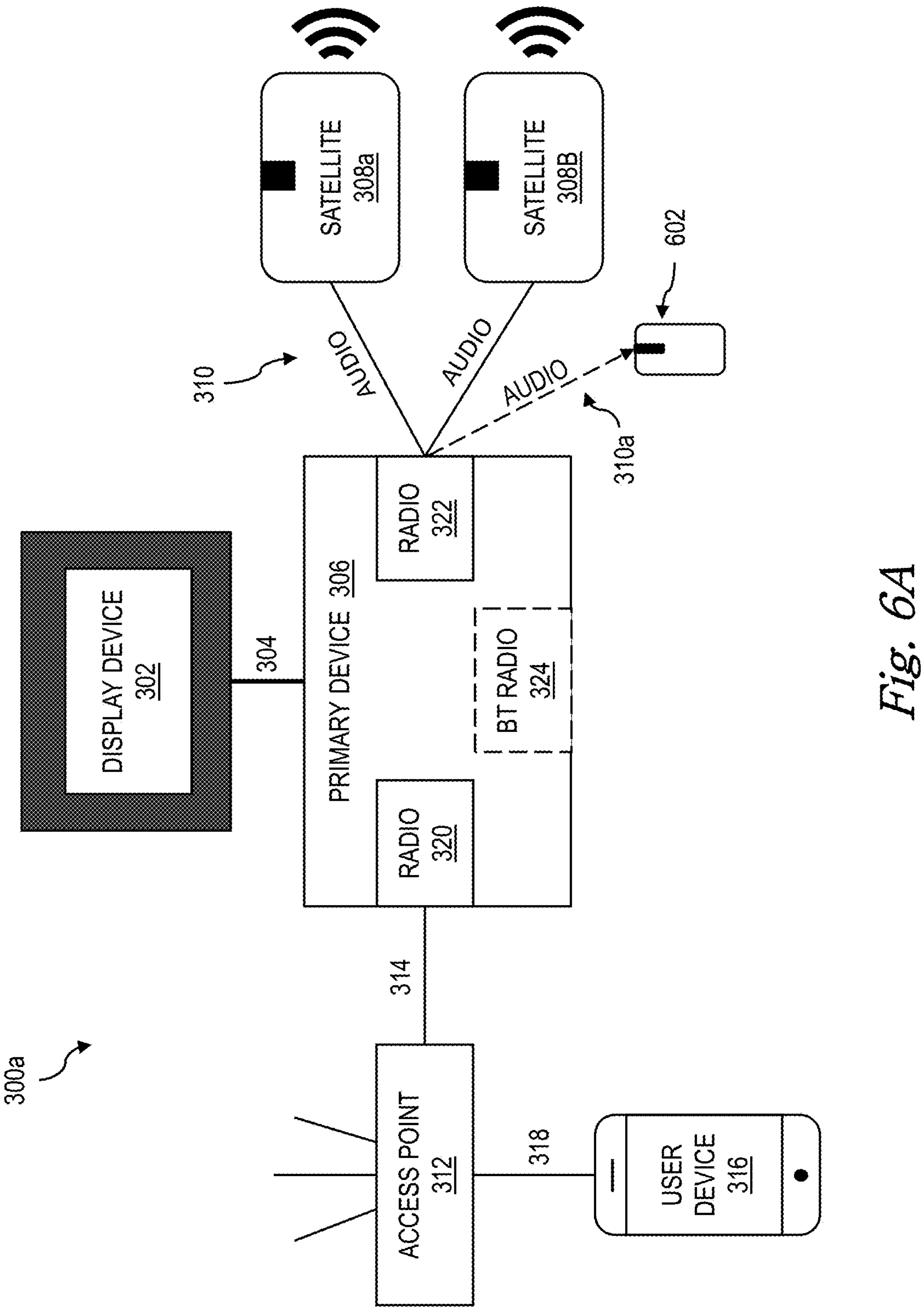
FIG. 6A is a block diagram of one example of a home theater environment according to aspects of the present disclosure.

For example, referring to FIG. 6A, there is illustrated an example 300*a* of the home theater environment 300 including a target device 602 for a playback session swap request. The target device 602 may be a wearable playback device, such as headphones, for example, or a portable playback device. In one example, the playback session swap request includes a join request, namely, a request to the add the target device 602 to the bonded group (e.g., the satellite devices 308 and optionally the primary device 306) rendering the audio content associated with the playback session. Thus, in determining the context of the playback session at operation 504, the primary device 306 may determine that the playback session swap request involves a join operation. At operation 504, the primary device may further determine whether or not the target device 602 is WI-FI-capable (e.g., includes a wireless interface having at least one 802.11 transceiver) and whether or not the target device 602 is compatible with the network protocol and wireless channel employed for the fronthaul connection 310. The primary device 306 may also determine whether or not the addition of the target device 602 should alter audio channel responsibilities of any of the satellite playback devices 308 or the primary device 306.

In one example, based on the determining that the target 602 is WI-FI-capable and compatible with the network channel used for the fronthaul connection 310, the primary device 306 may add the target 602 to the bonded group and establish a communication link 310*a* with the portable playback device 602 using the fronthaul radio 322, and begin transmitting one or more audio channels of the audio content to the portable playback device 602. In this example, in the case of a join request, the primary device 306 may continue to transmit one or more channels of the audio content to the satellite devices 308 via the communication links 310, and the satellite devices 308 and the target device 602 may render the audio content in synchrony with one another, as described above. Thus, the target device 602 becomes an additional satellite device of the primary device 306.

In some examples, if the target device 602 is not compatible with the wireless channel currently employed for the fronthaul connection 310, the primary device 306 may switch the fronthaul connection to a different wireless channel that is suitable for the target device and the satellite devices 308 (e.g., from a channel in a 6 GHz frequency band to a channel in a 5 GHz frequency band).

Figure 7:
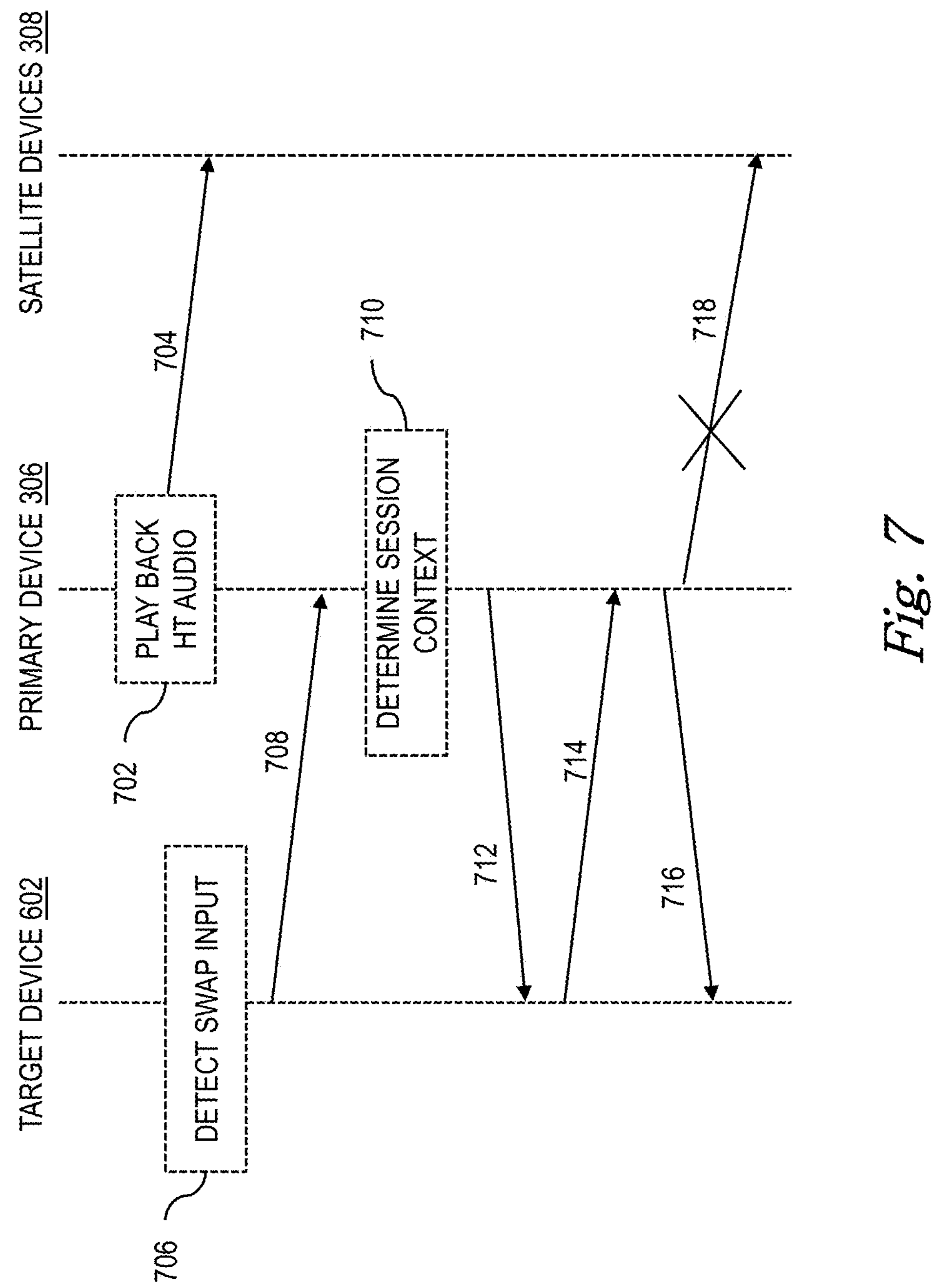
FIG. 7 is a sequence diagram illustrating an example of communication flow among network devices during a playback session transition according to aspects of the present disclosure.

A playback session swap request to transition the playback session from the satellite devices 308 (and optionally the primary device 306) to the target device 602 (i.e., a true swap) maybe similarly processed. FIG. 7 illustrates a sequence diagram corresponding to one example of a swap methodology according to certain aspects. In this example, prior to detecting the playback session swap request, the primary device 306 is in a home theater mode in which the primary device and the satellite devices 308 are engaged in a home theater playback session that involves synchronous rendering of home theater audio content by the satellite devices 308 (and optionally the primary device 306) in lip-synchrony with video content displayed by the display device 302. While in the home theater mode, to perform a swap, the primary device 306 device may enter another mode, referred to herein as a "home theater swap mode," or simply "swap mode."

In the example illustrated in FIG. 7, before entering the swap mode, at 702, the primary device 302 is playing back audio received via the audio interface 404 in a home theater mode. As a sourcing device of the bonded group that includes the satellite devices 308, in the home theater mode, the primary device 306 distributes audio content (as indicated at 704) to the satellite device 308 according to their roles (e.g., responsibilities for rendering one or more audio channels) in the bonded group, as described above.

At 706, the target device 602 detects a playback session input, for example, via user interaction with the user interface of the target device 602.

At 708, the target device 602 sends data to the primary device 306 representing a playback session swap request, which is detected by the primary device 306.

Based on detecting the playback session swap request, the primary device, at 710, determines a context of the playback session, which as described above, may include evaluating various factors associated with the playback session.

In the example of FIG. 7, based on determining, at 710, that the audio content is associated with video content (e.g., in this example, the primary device is in the home theater mode), the primary device 306 may transition from the home theater mode to the swap mode. Accordingly, at 712, the primary device 306 adds the target device 602 to a bonded group that includes the satellite devices 308, and the target device effectively becomes a satellite device of the primary device 306. In some examples, operation 712 is performed in the same manner to add the target playback device 602 as in processing a join request, as described above with reference to FIG. 6A. In other examples, the primary device 306 creates a new bonded group that includes the primary device and the target device 602, and optionally satellite devices 308. In some examples, at operation 712, the primary device 306 sends, to the target playback device 602 via the wireless communication interface 402, information regarding the wireless network in which the communication links 310 operate. This information allows the target device 602 to connect to the network and the communication link 310*a* to be established. For example, the information may include data representing one or more of: a service set identifier (SSID) associated with the wireless network, a basic service set identifier (BSSID) associated with the wireless network, and/or security credentials associated with the wireless network (e.g., a password and/or passphrase for the wireless network), which allows the target device 602 to connect to the wireless network. After the target device 602 connects to the wireless network and the communication link 310*a* is established, the primary device 306 adds the target device 602 to the new or existing bonded group, as described above.

At 714, after connecting to the wireless network, the target device 602 sends a message to the primary device 306 to indicate to the primary device 306 that the target device is ready to start streaming a home theater (HT) audio stream.

In some examples, the primary device 306 "parks" the satellite devices 308 on a second wireless network in a second wireless frequency band because the satellite devices will not be playing audio. Parking the satellite devices 308 on the second wireless network allows the satellite devices 308 to remain contactable (e.g., to eventually re-form the bonded group when the primary device 306 transitions back to the home theater mode) and to receive updates on the state of the media playback system 100 (e.g., state variable events). The primary device 306 may form this second wireless network using the communication interface 402.

At 718, the primary device 306 stops streaming the HT audio stream to the satellite devices 308. Operation 718 may be performed as part of or in connection with parking the satellite devices 308 on a second wireless network. In some examples, forming a new bonded group at 712 removes the primary device 306 from any existing bonded group, which causes the satellite devices 308 to stop receiving the HT audio stream.

Figure 6B:
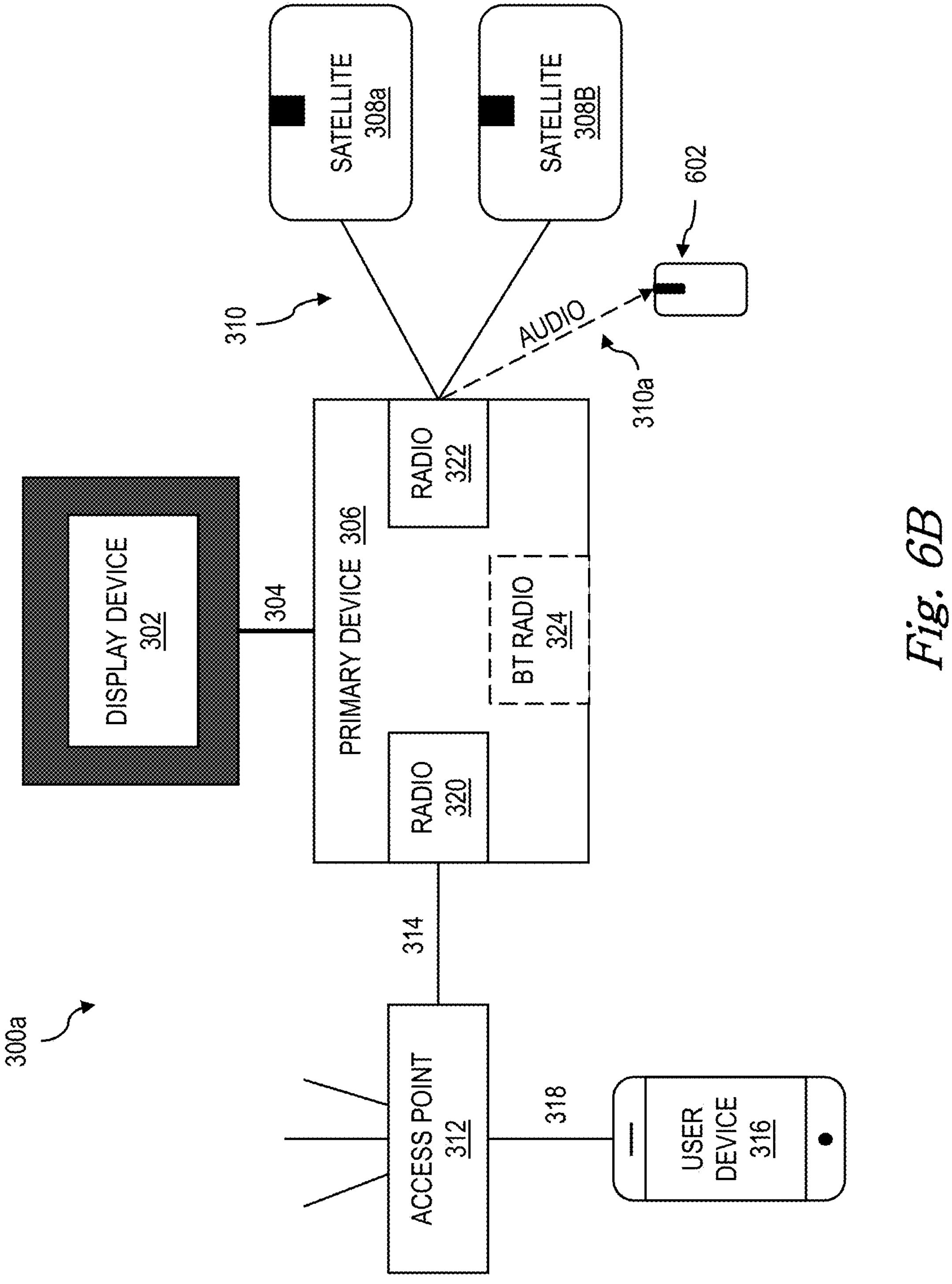
FIG. 6B is a block diagram of another example of a home theater environment according to aspects of the present disclosure.

At 716, the primary device 306 streams the HT audio stream to the target device 602 for playback. FIG. 6B illustrates an example of the home theater environment 300*a* with the target device 602 receiving an audio stream from the primary device 306 via the communication link 310*a*. In this example, the satellite devices remain "parked" on the wireless network, but are not receiving the audio stream from the primary device 306. In some examples, in connection with the target device 602 receiving the audio stream and playing back the audio content, the primary device 306 mutes to complete the swap. When muted, the primary device 306 may continue to process audio data for playback synchronously with the target device 602.

While in the swap mode, the primary device 306 may detect an event representing a trigger to transition from operating in the swap mode to operating in the home theater mode. Such an event may include receiving, from the target device 602, data representing instructions to transition to the home theater mode (e.g., to end the swap mode), which the target device 602 may send after receiving a swap input while rendering the audio content. As another example, the primary device 306 may detect that the target device 602 has disconnected from the wireless network (and is therefore no longer operating as a satellite) or been paused for a specified amount of time. Based on detecting such an event, the primary device 306 may transition to the home theater mode.

Various other examples of swap transitions are described in U.S. Pat. No. 11,356,777 referenced above.

In the above described example, at operation 504, the primary device 306 determines that the type of audio content for the playback session is an HT audio stream, or audio content that is associated with, and to be rendered in lip-synchrony with, video content displayed on the display device 302. Accordingly, at operation 506, in processing the playback session swap request, the primary device 306 grants the swap request and initiates the swap (or join) as described above. Further, in the examples of FIGS. 6A and 6B, the target device 602 connects to the wireless network established by the primary device using the fronthaul radio 322. Thus, in this case, in determining the context of the playback session at operation 504, the primary device determines that the target device 602 is WI-FI-capable, and optionally, that it is desirable in the circumstances to transmit the audio stream to the target device 602 using WI-FI. For example, the primary device 306 may not be equipped with the BLUETOOTH interface 324 and therefore, the only option may be to communicate with the target device 602 over WI-FI. In another example, for a join request, it may be optimal, or at least preferable, to have all the satellite devices 308, 602 on the same wireless network to help avoid any timing or synchrony issues associated with using different networks (e.g., WI-FI and BLUETOOTH) that may result in one or more of the satellite devices 308, 602 losing lip synchrony with the video content or losing synchrony with the other satellites.

Figure 8:
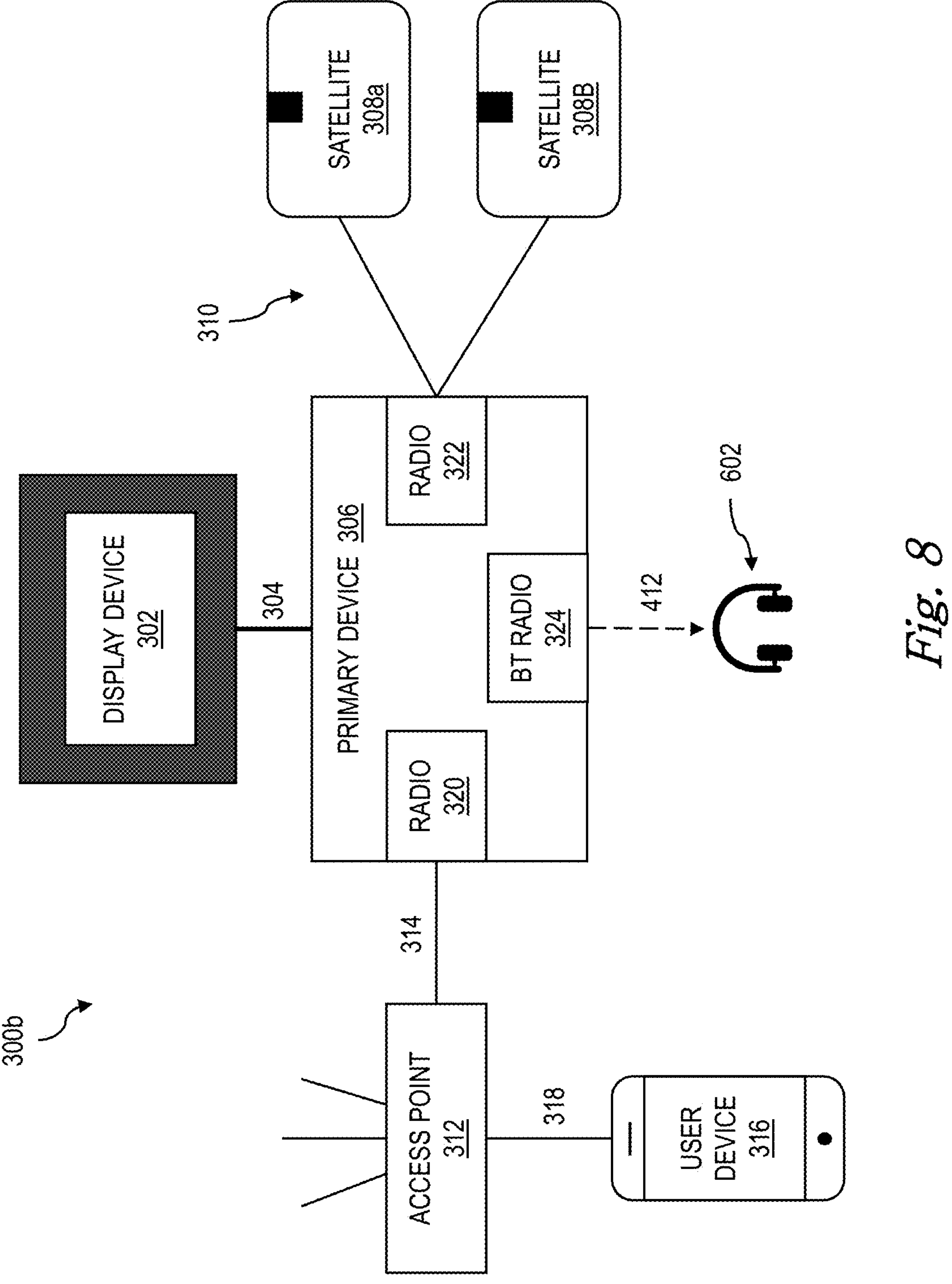
FIG. 8 is a block diagram of another example of a home theater environment according to aspects of the present disclosure.

In other examples, however, in processing the playback session swap request at operation 506, the primary device 306 may establish a communication link 412 with the target device 602 using the BLUETOOTH interface 324. FIG. 8 illustrates such an example. In some instances, it may be preferable to use the BLUETOOTH interface 324 to transmit the audio stream to the target device 602, rather than using a WI-FI connection. For example, BLUETOOTH communications may consume less power, and therefore may be preferable to preserve battery life of the target device 602. In some instances, the target device 602 may not be WI-FI-capable or may have only limited WI-FI capability. Accordingly, as discussed above, in some examples, determining the context of the playback session at operation 504 includes determining one or more characteristics of the target device 602, such as whether the target device 602 is WI-FI-capable and/or BLUETOOTH-capable, for example. Operation 504 may further include determining one or more characteristics of the primary device 306, such as whether or not the primary device 306 includes the BLUETOOTH interface 324 and is therefore capable of streaming the audio stream to the target device over the BLUETOOTH connection 412. In other examples, a PAN other than BLUETOOTH may be used, and operations described herein with reference to BLUETOOTH may be similarly performed for other types of PANs.

Referring to FIGS. 7 and 8, in the example home theater environment 300*b* of FIG. 8, operation 712 includes establishing the BLUETOOTH link 412 with the target device 602 and forming a new bonded group that includes the primary device 306 and the target device 602. Operation 716 includes transmitting the audio stream from the primary device 306 to the target device 602 over the BLUETOOTH link 412. In the example of FIG. 8, the satellite devices 308 may remain parked on the wireless network formed by the primary device 306 using the fronthaul radio 322, as described above, but may not receive the audio stream.

As described above, in some examples, determining the context of the playback session at operation 504 includes determining the type of audio content being played during the playback session, and operation 506 may include processing the playback session swap request based on the type of audio. For example, if the type of audio content is audio content associated with video content (e.g., home theater audio), the primary device may initiate and complete the swap procedure according to the examples discussed above. In other examples, however, the audio content may be audio content that is not associated with video content, such as music, news, a podcast, audio book, etc.

In the case of home theater audio, it may be reasonable to assume that the listener will remain in the vicinity of the display device 302. Accordingly, it may be practical for the primary device 306 to act as a sourcing device of the audio content for the target device 602. Thus, the primary device 306 may continue to receive the audio content from the display device 302 (e.g., using the audio interface 404) and stream the audio content to the target device 602 using either the fronthaul radio 322 or the BLUETOOTH radio 324, as described above. Where the audio content is not associated with video content; however, the listener may not remain near the primary device 306, but may intend to move to a different location or roam about the environment 101, taking the target device 602 with them. In such instances, the target device 602 may move outside of the BLUETOOTH or WI-FI range of the primary device 306, which could cause a loss of the connection 310*a* or 412 that would disrupt the listening experience. Accordingly, it may be preferable to designate a network device in the media playback system 100 than the primary device 306 to become the sourcing device of the audio content for the target device 602. Alternatively or additionally, in some examples where the target device 602 is WI-FI-capable, the primary device 306 may establish a connection with the target device 602 via the AP 312 and continue to stream the audio content to the target device 602 using the backhaul radio 320. Further, in some examples where the target device 602 has sufficient processing capacity, the primary device may transition receipt and processing of the audio content to the target device 602, which may receive the audio content via the backhaul radio 320 or the user device 316.

Furthermore, various streaming services or applications that provide audio content may have different licensing or subscription requirements that may limit which playback devices may access and/or render the audio content. For example, as discussed above, playback session data may include authorization data, such as one or more keys and/or tokens. In some instances, a token associated with a particular streaming service or application may not be authorized on the target device 602. For example, certain target devices, such as some portable devices, may be able to acquire and authorize tokens that allow such target devices to render the associated audio content. Other target devices, such as some headphone devices, for example, may not be able to authorize tokens associated with at least some streaming services or applications. Accordingly, in determining the context of the playback session at operation 504, the primary device 306 may determine whether or not the audio content is from a restricted source (e.g., one that requires authorization, such as an authorization token) and whether or not the target device 602 is able to acquire and/or supply the necessary authorization.

In some examples, based on determining at operation 504 that the audio content is audio content associated with video content (e.g., home theater audio), the primary device 306 may initiate and complete the swap procedure as described above. In contrast, based on determining at operation 504 that the audio content is audio content that is not associated with video content, the primary device 306 may deny the playback session swap request. In other examples, based on determining at operation 504 that the audio content is audio content that is not associated with video content, the primary device 306 may evaluate other factors during operation 504, such as whether or not the source of the audio content is a restricted source and/or whether or not the target device 602 can be authorized to render audio content from the restricted source. In some examples, the primary device may access a list of audio content sources, such as a list of various audio streaming services or applications, wherein the list indicates for each source whether or not swap procedures are supported and, optionally, under what circumstances. For example, for a particular audio streaming service, the list may indicate that swaps are supported for portable playback devices but not for headphones. Based on the information contained in the list, the primary device 306 may accept or deny the playback session swap request depending on the source of the audio content and the type of target device 602.

In some instances, the primary device 306 may attempt to find an alternate solution to allow completion of a playback session swap request. For example, if the audio content is from a restricted source such that a swap to headphones may not be ordinarily permitted, the primary device 306 may determine that the audio content is available from another, non-restricted source (e.g., a different streaming service or application, or the user's own music library). Accordingly, processing the playback session swap request at operation 506 may include transitioning the playback session to access the audio content from the non-restricted source as well as completing the swap so as to stream the audio content to the target device 602, as described above.

Figure 9:
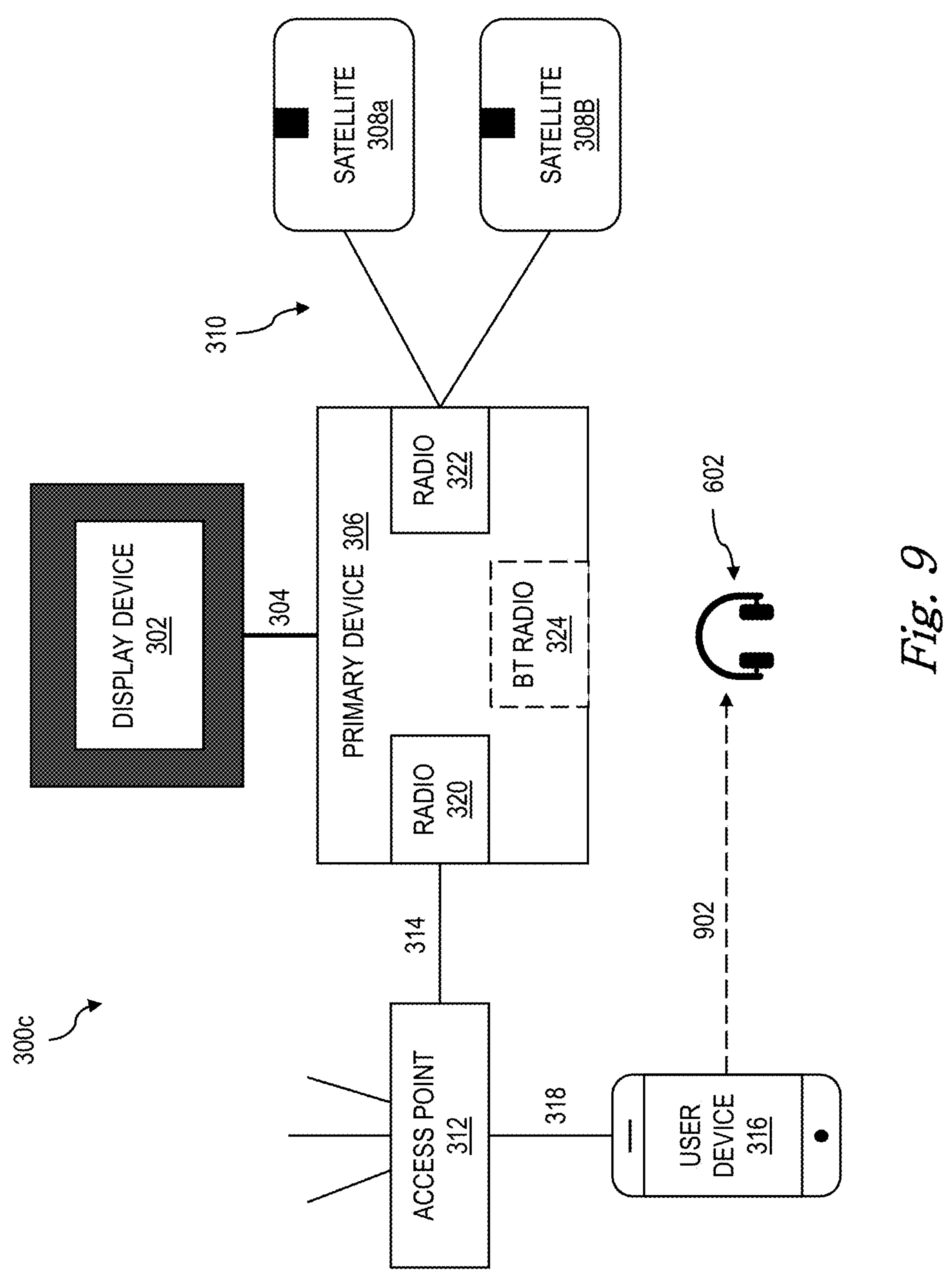
FIG. 9 is a block diagram of another example of a home theater environment according to aspects of the present disclosure.
Figure 10:
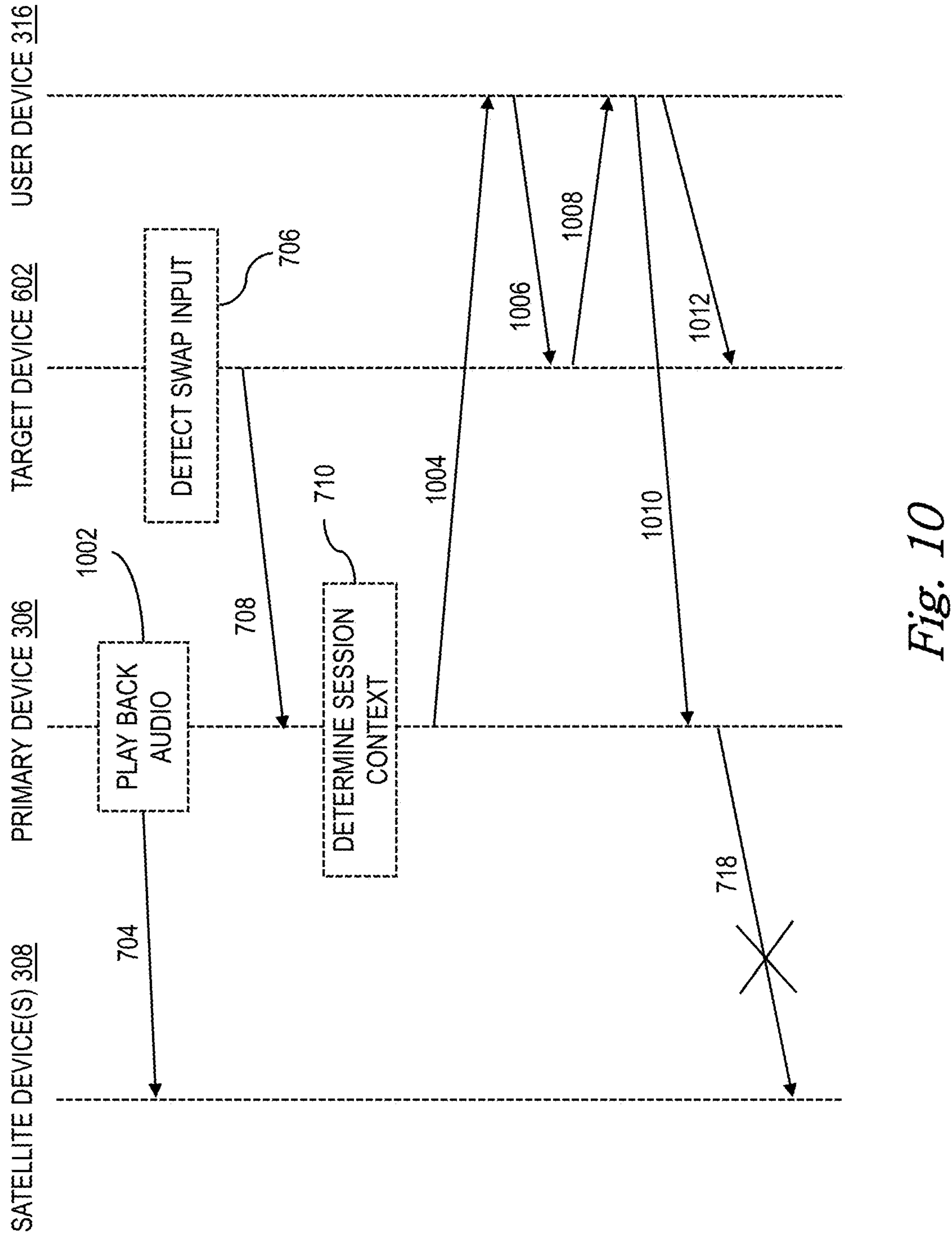
FIG. 10 is a sequence diagram illustrating another example of communication flow among network devices during a playback session transition according to aspects of the present disclosure.

Referring to FIGS. 9 and 10, according to certain examples, based on determining (at operation 504) that the audio content for the playback session is not associated with video content, as part of processing the playback session swap request at operation 504, the primary device 306 may direct an intermediate device to assume control of the playback session and communicate the audio content to the target device 602. This approach may be useful in various different circumstances. For example, as discussed above, in some instances a user may wish to move around with the target device, and therefore directing an intermediate device (such as the user device 316, for example) to become the sourcing device for the audio content instead of the primary device 306 may prevent the playback session from being disrupted if the target device 602 moves out of BLUETOOTH or WI-FI range of the primary device 306. In another example where the source of the audio content is a restricted source, the intermediate device may be able to either supply the necessary authorization on behalf of the target device, or stream the audio content from a different, non-restricted source. Thus, while in some examples, processing a swap request involves transitioning the playback session directly to an endpoint target device 602, as described above, in other examples, the swap may be accomplished using an intermediate device.

In the example home theater environment **300*c* illustrated in FIG. 9, the intermediate device is the user device 316. After or during assuming control of the playback session from the primary device 306, the user device 316 establishes a BLUETOOTH connection 902 with the target device 602 and can stream the audio content to the target device over the BLUETOOTH connection 902**.

Referring to FIG. 10, at 1002 the primary device 306 is coordinating synchronous playback of audio content by the satellite devices 308. In this example, the audio content is not associated with video content. The primary device 306 may or may not also be playing one or more audio channels of the audio content in synchrony with the satellite devices 308.

Operations 704, 706, and 708 may be performed in the same manner as described above with reference to FIG. 7.

At 710, in determining the context of the playback session, the primary device determines that directing an intermediate device to assume control of the playback session is warranted. For example, this may be determined based on any of the conditions described above in which transfer of control of the playback session to an intermediate device may be beneficial.

Accordingly, at 1004, the primary device 306 communicates one or more messages to an intermediate device to direct the intermediate device to assume control of the playback session. In the example illustrated in FIGS. 9 and 10, the intermediate device is the user device 316. However, in other examples, another network device in the media playback system 100, such as another playback device 110, an NMD 120, or a control device 130, may be selected as the intermediate device. In certain examples, as part of operation 1004, the primary device 306 transmits playback session information to the user device 316 to assist the user device in assuming control of the playback session. For example, the primary device 306 may identify a source of the audio content and identify a transfer point in an audio stream corresponding to the audio content. The playback session information transmitted to the user device 316 may include information identifying the source of the audio content and the transfer point in the audio stream. The playback session information may also include timing information to allow the user device 316 to synchronize playback of the audio content by the target playback device at the transfer point. This may allow the swap to occur with minimal disruption to the listening experience.

At 1006, the user device transmits one or more messages to the target device 602 to establish the BLUETOOTH connection 412 with the target device 306.

At 1008, the target device 602 transmits one or more messages to the user device 316 to confirm that the BLUETOOTH connection 412 is established and the target device is ready to receive the audio stream.

At 1010, the user device 316 may confirm to the primary device 306 that the user device has assumed control of the playback session, and at 1012, the user device 316 begins streaming the audio content to the target device 602 over the BLUETOOTH connection 412.

Accordingly, at 718 the primary device 306 stops streaming the audio stream to the satellite devices 308. Operation 718 may be performed as part of or in connection with parking the satellite devices 308 on a wireless network, as described above.

In the above-described examples, the primary device 306 determines to direct the user device 316 to assume control of the playback session based, at least in part, on the type of audio content being played during the playback session. In some examples, the primary device 306 may transfer control of the playback session to an intermediate device, such as the user device 316, based on characteristics of the target device 602 and/or the primary device, regardless of the type of audio content associated with the playback session. For example, if the primary device 306 detects a playback session swap request to a target device that does not have WI-FI capability (or has only limited WI-FI capability), but the primary device 306 does not include the BLUETOOTH interface 324, the primary device may direct the user device 316 (or another intermediate device) to assume control of the playback session such that the audio content can be streamed to the target device over the BLUETOOTH connection 902. This may occur even if the audio content is associated with video content displayed by the display device 302.

Numerous other conditions and examples may be apparent based on the examples described herein and are intended to be covered by this disclosure.

As described above, in some examples, the context of the playback session includes the location of the target device and/or other playback devices in the media playback system 100. In some examples, the proximity of one or more playback devices to another playback device (or group of playback devices) engaged in an active playback session may be used to identify a potential target device for a playback session swap request. In some examples, as described above, the swap input is provided via the user interface of the target device 602, and therefore, the target device is recorded. However, in other examples, the swap input may be provided via a device (e.g., the primary device 306 or a control device 130) that is not the target device. In such examples, the target device may or may not be recorded. Accordingly, in some examples, location information of playback devices in the media playback system 100 can be used by the primary device 306 to identify a target device (e.g., a playback device that is not presently rendering audio content, but that is nearby to a playback device that is rendering audio content). For example, if an idle portable playback device is located nearby a home theater satellite device that is rendering audio content, the portable playback device may be reasonably assumed to be a potential target for a swap from the home theater satellite device.

In another example, if a portable playback device has an active playback session and receives a swap input, the portable playback device may assume that the user wants to transfer the playback session to a nearby playback device. In such examples, the portable playback device is the source of the swap ("initiating playback device") and the nearby playback device is identified as the target device. Some example techniques for identifying nearby playback devices involve audio-based identification. In exemplary audio-based identification techniques, the initiating playback device requests that swap-eligible playback devices emit an identifiable sound (such as an audio chirp), which can be detected by one or more microphones of the initiating playback device. The initiating playback device may then identify nearby playback devices based on the characteristics of the detected sounds. For example, each audio chirp may include data in the form of an encoded identifier. Each encoded identifier may be different and encoded as a set of tones, which is known to the initiating playback device. Examples of using audio-based identification and localization techniques, and selecting target playback devices based on location, are described in International Patent Publication No. WO 2024/073649 titled "NETWORK HANDOFF FOR PORTABLE PLAYBACK DEVICES" and filed on Sep. 29, 2023, which is hereby incorporated herein by reference in its entirety for all purposes.

Thus, aspects and embodiments disclosed herein provide techniques, and playback devices configured to implement such techniques, for processing playback session transition requests based on the context of the individual playback session. As described above, numerous factors can be considered as part of the context of the playback session, and the transition request can be processed according to any one or more of these factors. In this manner, seamless transitions can be accomplished under a wide range of different conditions, while requiring minimal user interaction.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

V. Additional Examples

The following examples pertain to further embodiments, from which numerous permutations and configurations will be apparent.

Example 1 provides a playback device comprising a first wireless communication interface, at least one processor; and at least one tangible non-transitory computer-readable medium storing program instructions that, when executed by the at least one processor, cause the playback device to join a bonded group including one or more satellite playback devices, receive audio content, transmit, via the first wireless communication interface, one or more channels of the audio content to the one or more satellite playback devices, during a playback session, render at least one channel of the audio content in synchrony with rendering of the one or more channels of the audio content by the one or more satellite playback devices, during the playback session, detect a request to transfer playback of the audio content to a portable playback device, and process the request based on the portable playback device and on a type of the audio content.

Example 2 includes the playback device of Example 1, wherein the portable playback device is a headphone device, and wherein to process the request includes to deny the request based on the type of the audio content being a first type, or to initiate the transfer based on the type of the audio content being a second type different from the first type.

Example 3 includes the playback device of Example 3, further comprising a second wireless communication interface, and wherein the at least one tangible non-transitory computer-readable medium further stores program instructions that, when executed by the at least one processor, cause the playback device to, after initiating the transfer of the playback of the audio content to the second playback device, communicate the audio content to the second playback device via the second wireless communication interface.

Example 4 includes the playback device of Example 3, wherein the second wireless communication interface comprises a Bluetooth interface.

Example 5 includes the playback device of any one of Examples 2-4, wherein the first type is audio content that is not associated with visual content and wherein the second type is audio content that is associated with visual content.

Example 6 includes the playback device of any one of Examples 2-4, wherein the first type is audio content that is not associated with visual content and wherein the second type is audio content that is to be rendered in lip-synchrony with visual content.

Example 7 includes the playback device of any one of Examples 2-4, further comprising an audio interface, and wherein the first type of audio content is audio content received via the first wireless communication interface and the second type of audio content is audio content received via the audio interface.

Example 8 includes the playback device of Example 7, wherein the audio interface includes an HDMI port.

Example 9 includes the playback device of Example 7, wherein the audio interface includes an optical audio port.

Example 10 includes the playback device of any one of Examples 1-9, wherein the first wireless communication interface comprises radio circuitry including a first radio and a second radio, and at least one antenna coupled to the radio circuitry, and wherein the playback device is configured to receive the audio content using the first radio and to communicate the one or more channels of the audio content to the one or more satellite playback device using the second radio.

Example 11 includes the playback device of any one of Examples 1-10, wherein to process the request, the at least one tangible non-transitory computer-readable medium further stores program instructions that, when executed by the at least one processor, cause the playback device to establish, via the first wireless communication interface, a wireless link with the portable playback device, add the portable playback device to the bonded group, and transmit, via the first communication interface, at least one channel of the audio content to the portable playback device for rendering in synchrony with rendering of the one or more channels of the audio content by the playback device.

Example 12 includes the playback device of Example 11, wherein to process the request, the at least one tangible non-transitory computer-readable medium further stores program instructions that, when executed by the at least one processor, cause the playback device to determine that the audio content is associated with video content.

Example 13 includes the playback device of Example 1, further comprising a second wireless communication interface, wherein the portable playback device is a headphone device; and wherein to process the request comprises to, based on the audio content being video audio, communicate the audio content to the portable playback device via the second communication interface, or based on the audio content being music audio, direct an intermediate device to assume control of the playback session and communicate the audio content to the portable playback device.

Example 14 includes the playback device of Example 13, wherein to direct the intermediate device to assume control of the playback session comprises to identify a source of the audio content, identify a transfer point in an audio stream corresponding to the audio content, and transmit playback session information to the intermediate device, the playback session information including the source of the audio content, the transfer point in the audio stream, and timing information to allow the intermediate device to synchronize playback of the audio content by the portable playback device with the transfer point.

Example 15 includes the playback device of one of Examples 13 or 14, wherein the second wireless communication interface is a Bluetooth interface.

Example 16 provides a first playback device comprising a wireless communication interface, at least one processor, and at least one tangible non-transitory computer-readable medium storing program instructions that, when executed by the at least one processor, cause the first playback device to receive audio content, during a playback session, communicate, via the wireless communication interface, one or more channels of the audio content to at least one second playback device to coordinate synchronous rendering of the audio content by the at least one second playback device, during the playback session, detect a request to transfer playback of the audio content to a third playback device, determine a context of the playback session, and process the request according to the context of the playback session.

Example 17 includes the first playback device of Example 16, wherein the third playback device is a headphone device.

Example 18 includes the first playback device of Example 17, wherein to determine the context of the playback session comprises to determine a type of the audio content, and wherein to process the request comprises to initiate the transfer based on the type of the audio content being a first type, or to deny the request based on the type of the audio content being a second type different from the first type.

Example 19 includes the first playback device of Example 18, wherein the wireless communication interface is a first wireless communication interface, wherein the first playback device further comprises a second wireless communication interface, and wherein the at least one tangible non-transitory computer-readable medium further stores program instructions that, when executed by the at least one processor, cause the first playback device to, after initiating the transfer of the playback of the audio content to the third playback device, communicate the audio content to the third playback device via the second wireless communication interface.

Example 20 includes the first playback device of one of Examples 18 or 19, wherein the first type is audio content that is associated with video content and wherein the second type is audio content that is not associated with video content.

Example 21 includes the first playback device of one of Examples 18 or 19, wherein the at least one tangible non-transitory computer-readable medium further stores a list of audio streaming services, the list indicating for each individual audio streaming service whether the individual audio streaming service is restricted or unrestricted, and wherein second type is audio content from a restricted audio streaming service.

Example 22 includes the first playback device of any one of Examples 19-21, wherein the second wireless communication interface comprises a Bluetooth interface.

Example 23 includes the first playback device of Example 17, wherein to determine the context of the playback session comprises to determine a type of the audio content, and wherein to process the request comprises, based on the audio content being associated with video content, communicate the audio content to the third playback device via the second wireless communication interface, or based on the audio content not being associated with video content, direct an intermediate device to assume control of the playback session and communicate the audio content to the third playback device.

Example 24 includes the first playback device of Example 23, wherein to direct the intermediate device to assume control of the playback session comprises to identify a source of the audio content, identify a transfer point in an audio stream corresponding to the audio content; and transmit playback session information to the intermediate device, the playback session information including the source of the audio content, the transfer point in the audio stream, and timing information to allow the intermediate device to synchronize playback of the audio content by the third playback device with the transfer point.

Example 25 includes the first playback device of any one of Examples 16-24, wherein the first playback device is a home theater primary device.

Example 26 includes the first playback device of Example 25, wherein the first playback device is a soundbar.

Example 27 includes the first playback device of any one of Examples 16-26, wherein the wireless communication interface comprises radio circuitry including a first radio and a second radio, and at least one antenna coupled to the radio circuitry, wherein the first playback device is configured to receive the audio content using the first radio and to communicate the one or more channels of the audio content to the at least one second playback device using the second radio.

Example 28 includes the first playback device of any one of Examples 16-27, wherein the at least one tangible non-transitory computer-readable medium further stores program instructions that, when executed by the at least one processor, cause the first playback device to render at least one channel of the audio content in synchrony with rendering of the one or more channels of the audio content by the at least one second playback device.

Example 29 provides a method comprising receiving audio content, during a playback session, communicating one or more channels of the audio content to at least one satellite playback device to coordinate synchronous rendering of the audio content by the at least one satellite playback device, during the playback session, detecting a request to transfer playback of the audio content to a target playback device, determining a context of the playback session, and processing the request according to the context of the playback session.

Example 30 includes the method of Example 29, wherein determining the context of the playback session comprises to determining a type of the audio content, and wherein processing the request comprises initiating the transfer based on the type of the audio content being a first type, or denying the request based on the type of the audio content being a second type different from the first type.

Example 31 includes the method of Example 30, wherein the first type is audio content that is associated with video content and wherein the second type is audio content that is not associated with video content.

Example 32 includes the method of Example 29, wherein determining the context of the playback session comprises determining a type of the audio content, and wherein processing the request comprises, based on the audio content being associated with video content, communicating the audio content to the target playback device, or based on the audio content not being associated with video content, directing an intermediate device to assume control of the playback session and communicate the audio content to the target playback device.

Example 33 includes the method of Example 32, wherein directing the intermediate device to assume control of the playback session comprises identifying a source of the audio content, identifying a transfer point in an audio stream corresponding to the audio content, and transmitting playback session information to the intermediate device, the playback session information including the source of the audio content, the transfer point in the audio stream, and timing information to allow the intermediate device to synchronize playback of the audio content by the target playback device with the transfer point.

Example 34 includes a playback device configured to implement the method of any one of Examples 29-33.

The invention claimed is:

1. A playback device comprising:

a first wireless communication interface;

at least one processor; and at least one tangible non-transitory computer-readable medium storing program instructions that, when executed by the at least one processor, cause the playback device to join a bonded group including one or more satellite playback devices, receive audio content, transmit, via the first wireless communication interface, one or more channels of the audio content to the one or more satellite playback devices, during a playback session, render at least one channel of the audio content in synchrony with rendering of the one or more channels of the audio content by the one or more satellite playback devices, during the playback session, detect a request to transfer playback of the audio content to a portable playback device, and process the request based on the portable playback device and on a type of the audio content.

2. The playback device of claim 1, wherein the portable playback device is a headphone device; and wherein to process the request includes to deny the request based on the type of the audio content being a first type, or to initiate the transfer based on the type of the audio content being a second type different from the first type.

3. The playback device of claim 2, further comprising:

a second wireless communication interface, the second wireless communication interface comprising a BLUETOOTH interface; and wherein the at least one tangible non-transitory computer-readable medium further stores program instructions that, when executed by the at least one processor, cause the playback device to:

after initiating the transfer of the playback of the audio content to the second playback device, communicate the audio content to the second playback device via the second wireless communication interface.

4. The playback device of claim 2, wherein the first type is audio content that is not associated with visual content and wherein the second type is audio content that is associated with visual content.

5. The playback device of claim 1, wherein the first wireless communication interface comprises:

radio circuitry including a first radio and a second radio; and at least one antenna coupled to the radio circuitry, wherein the playback device is configured to receive the audio content using the first radio and to communicate the one or more channels of the audio content to the one or more satellite playback device using the second radio.

6. The playback device of claim 1, wherein to process the request, the at least one tangible non-transitory computer-readable medium further stores program instructions that, when executed by the at least one processor, cause the playback device to:

determine that the audio content is associated with video content;

establish, via the first wireless communication interface, a wireless link with the portable playback device;

add the portable playback device to the bonded group; and transmit, via the first wireless communication interface, at least one channel of the audio content to the portable playback device for rendering in synchrony with rendering of the one or more channels of the audio content by the playback device.

7. The playback device of claim 1, further comprising a second wireless communication interface;

wherein the portable playback device is a headphone device; and wherein to process the request comprises:

based on the audio content being associated with video content, communicate the audio content to the portable playback device via the second wireless communication interface; or based on the audio content not being associated with video content, direct an intermediate device to assume control of the playback session and communicate the audio content to the portable playback device.

8. The playback device of claim 7, wherein to direct the intermediate device to assume control of the playback session comprises to:

identify a source of the audio content;

identify a transfer point in an audio stream corresponding to the audio content; and transmit playback session information to the intermediate device, the playback session information including the source of the audio content, the transfer point in the audio stream, and timing information to allow the intermediate device to synchronize playback of the audio content by the portable playback device with the transfer point.

9. The playback device of claim 7, wherein the second wireless communication interface is a Bluetooth interface.

10. A first playback device comprising:

a wireless communication interface;

at least one processor; and at least one tangible non-transitory computer-readable medium storing program instructions that, when executed by the at least one processor, cause the first playback device to receive audio content, during a playback session, communicate, via the wireless communication interface, one or more channels of the audio content to at least one second playback device to coordinate synchronous rendering of the audio content by the at least one second playback device, during the playback session, detect a request to transfer playback of the audio content to a headphone device, determine a context of the playback session, and process the request according to the context of the playback session.

11. The first playback device of claim 10, wherein to determine the context of the playback session comprises to determine a type of the audio content; and
wherein to process the request comprises to initiate the transfer based on the type of the audio content being a first type, or to deny the request based on the type of the audio content being a second type different from the first type.

12. The first playback device of claim 11, wherein the wireless communication interface is a first wireless communication interface;
wherein the first playback device further comprises a second wireless communication interface; and
wherein the at least one tangible non-transitory computer-readable medium further stores program instructions that, when executed by the at least one processor, cause the first playback device to, after initiating the transfer of the playback of the audio content to the headphone device, communicate the audio content to the headphone device via the second wireless communication interface.

13. The first playback device of claim 12, wherein the second wireless communication interface comprises a BLUETOOTH interface.

14. The first playback device of claim 11, wherein the first type is audio content that is associated with video content and wherein the second type is audio content that is not associated with video content.

15. The first playback device of claim 11, wherein the at least one tangible non-transitory computer-readable medium further stores a list of audio streaming services, the list indicating for each individual audio streaming service whether the individual audio streaming service is restricted or unrestricted; and
wherein second type is audio content from a restricted audio streaming service.

16. The first playback device of claim 10, wherein to determine the context of the playback session comprises to determine a type of the audio content; and
wherein to process the request comprises:
based on the audio content being associated with video content, communicate the audio content to the headphone device via the second wireless communication interface; or
based on the audio content not being associated with video content, direct an intermediate device to assume control of the playback session and communicate the audio content to the headphone device.

17. The first playback device of claim 16, wherein to direct the intermediate device to assume control of the playback session comprises to:
identify a source of the audio content;
identify a transfer point in an audio stream corresponding to the audio content; and
transmit playback session information to the intermediate device, the playback session information including the source of the audio content, the transfer point in the audio stream, and timing information to allow the intermediate device to synchronize playback of the audio content by the headphone device with the transfer point.

18. The first playback device of claim 10, wherein the first playback device is a soundbar.

19. The first playback device of claim 10, wherein the wireless communication interface comprises:
radio circuitry including a first radio and a second radio; and
at least one antenna coupled to the radio circuitry,
wherein the first playback device is configured to receive the audio content using the first radio and to communicate the one or more channels of the audio content to the at least one second playback device using the second radio.

20. The first playback device of claim 10, wherein the at least one tangible non-transitory computer-readable medium further stores program instructions that, when executed by the at least one processor, cause the first playback device to render at least one channel of the audio content in synchrony with rendering of the one or more channels of the audio content by the at least one second playback device.

* * * * *